United States Patent
Tanaka et al.

(10) Patent No.: US 7,415,550 B2
(45) Date of Patent: Aug. 19, 2008

(54) SYSTEM AND METHOD FOR CONTROLLING DMA DATA TRANSFER

(75) Inventors: Ryuta Tanaka, Kawasaki (JP); Toru Tsuruta, Kawasaki (JP); Ritsuko Tanaka, Kasasaki (JP); Norichika Kumamoto, Ota (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/140,732

(22) Filed: Jun. 1, 2005

(65) Prior Publication Data
US 2005/0223136 A1    Oct. 6, 2005

Related U.S. Application Data

(63) Continuation of application No. PCT/JP03/02608, filed on Mar. 5, 2003.

(51) Int. Cl.
*G06F 3/00* (2006.01)
*G06F 13/28* (2006.01)

(52) U.S. Cl. .............................. 710/26; 710/1; 710/22; 710/23

(58) Field of Classification Search .............. 710/1, 710/3–4, 22–28
See application file for complete search history.

(56) References Cited

U.S. PATENT DOCUMENTS

| | | | | |
|---|---|---|---|---|
| 5,619,727 A | * | 4/1997 | Chen et al. ................. | 710/22 |
| 5,944,800 A | | 8/1999 | Mattheis et al. ............. | 710/23 |
| 6,108,761 A | * | 8/2000 | Johnson et al. ............. | 711/214 |
| 6,449,667 B1 | * | 9/2002 | Ganmukhi et al. .......... | 710/28 |
| 6,496,740 B1 | * | 12/2002 | Robertson et al. .......... | 700/20 |
| 2002/0194401 A1 | * | 12/2002 | Sakugawa .................. | 710/28 |

FOREIGN PATENT DOCUMENTS

| | | |
|---|---|---|
| EP | 1012732 | 6/2000 |
| JP | 51-77143 | 7/1976 |
| JP | 7-13920 | 1/1995 |
| JP | 2001-516925 | 10/2001 |
| WO | WO 99/14680 | 3/1999 |

OTHER PUBLICATIONS

International Search Report in corresponding application No. PCT/JP03/02608 dated May 27, 2003.

(Continued)

*Primary Examiner*—Niketa I. Patel
*Assistant Examiner*—Richard Franklin
(74) *Attorney, Agent, or Firm*—Staas & Halsey LLP

(57) ABSTRACT

A data transfer control system that can change the way of DMA transfers to meet the requirements of each application. The data transfer control system includes a DMA controller (DMAC) and a DMAC memory dedicated for DMA control purposes. The DMAC performs DMA transfers according to a DMA program stored in the DMAC memory. Each time a new DMA request is received, the DMAC saves its parameters in a DMA request parameter table, and each DMA request parameter table is registered with a DMA request management table. In this way, the received DMA requests are queued in the DMA request management table. They are executed in a first-in first-out fashion. The progress of ongoing DMA transfers are managed in a DMA channel status table disposed for each DMA channel.

15 Claims, 39 Drawing Sheets

OTHER PUBLICATIONS

Patent Abstracts of Japan, Publication No. 07-013920 dated Jan. 17, 1995.
Patent Abstracts of Japan, Publication No. 07-013921 dated Jan. 17, 1995.
Patent Abstracts of Japan, Publication No. 07-244632 dated Sep. 19, 1995.
Patent Abstracts of Japan, Publication No. 63-159961 dated Jul. 2, 1988.
Patent Abstracts of Japan, Publication No. 63-284635 dated Nov. 21, 1988.
Japanese Patent Office Action, mailed Feb. 19, 2008 and issued in corresponding Japanese Patent Application No. 2004-569091.

* cited by examiner

15a  DMA REQUEST PARAMETER TABLE

| ITEM | VALUE |
|---|---|
| SOURCE | 0x1000 |
| DESTINATION | 0x2000 |
| DATA SIZE | 0x200 |
| MODE | - |
| OPTIONAL PARAMETER | - |

FIG.2

15b DMA REQUEST MANAGEMENT TABLE

| REQUEST ID | POINTER | ATTRIBUTE |
|---|---|---|
| REQUEST #1 | POINTER TO DMA REQUEST PARAMETER TABLE #1 | VALID |
| REQUEST #2 | POINTER TO DMA REQUEST PARAMETER TABLE #2 | VALID |
| ... | ... | ... |
| REQUEST #n | POINTER TO DMA REQUEST PARAMETER TABLE #n | INVALID |

FIG. 3

15c DMA CHANNEL STATUS TABLE

| ITEM | VALUE |
|---|---|
| REQUEST MANAGEMENT TABLE POINTER | 0x5000 |
| REQUEST IN PROCESS | REQUEST#1 |
| SOURCE | 0x1000 |
| DESTINATION | 0x2000 |
| REMAINING DATA SIZE | 0x200 |
| MODE | - |
| OPTIONAL PARAMETER | - |

FIG. 4

15f CHANNEL MANAGEMENT TABLE

| RECORD NO. | CHANNEL POINTER (Pointer to DMA channel status table) | ATTRIBUTE |
|---|---|---|
| 1 | 0x100000 | VALID |
| 2 | 0x100100 | VALID |
| ⋮ | ⋮ | ⋮ |
| N | 0x101000 | INVALID |

FIG. 7

25a  DMA REQUEST SETTING TABLE

| CHANNEL NO. | ITEM | VALUE |
|---|---|---|
| CHANNEL#1 | STATUS | |
| | SOURCE | |
| | DESTINATION | |
| | TRANSFER DATA SIZE | |
| CHANNEL#2 | STATUS | |
| | SOURCE | |
| | DESTINATION | |
| | TRANSFER DATA SIZE | |
| ⋮ | ⋮ | |
| CHANNEL#N | STATUS | |
| | SOURCE | |
| | DESTINATION | |
| | TRANSFER DATA SIZE | |

FIG. 13

25e TRANSFER SYNCHRONIZATION TABLE

| CHANNEL No. | POINTER (Pointer to DMA Channel Status Table) | STATUS |
|---|---|---|
| 1 | 0x10000 | IN-PROGRESS |
| 2 | 0x10100 | COMPLETE |
| .. | .. | .. |
| N | 0x18000 | COMPLETE |

FIG. 18

25b  DMA CHANNEL STATUS TABLE

| ITEM | VALUE |
|---|---|
| REQUEST MANAGEMENT TABLE POINTER | 0x5000 |
| REQUEST IN PROCESS | REQUEST#1 |
| SOURCE | 0x1000 |
| DESTINATION | 0x2000 |
| REMAINING DATA SIZE | 0x200 |
| MODE | Repeat |
| OPTION PARAMETER | Forever |

FIG. 19

25g MEMORY AREA MANAGEMENT TABLE

| AREA No. | START ADDRESS | END ADDRESS | WRITE ATTRIBUTE | READ ATTRIBUTE |
|---|---|---|---|---|
| 1 | 0x000000 | 0x00FFFF | YES | YES |
| 2 | 0x010000 | 0x01FFFF | NO | YES |
| ⋮ | ⋮ | ⋮ | ⋮ | ⋮ |
| N | 0x300000 | 0x5FFFFF | YES | YES |

FIG. 22

61 BASIC REGISTER CONFIGURATION

| CLASSIFICATION | REGISTER NAME | REMARKS |
|---|---|---|
| ADDRESS REGISTER | An | n=0,1,2,... |
| REPEAT COUNTER | RPCm | m=0,1,2,... |
| PROGRAM COUNTER | PC | |

FIG. 26

62 BASIC INSTRUCTION SET

| INSTRUCTION FORMAT | OPERATION |
|---|---|
| set D, val | Set val to register D |
| load D, (SAD) | Load register D with data read out of source address SAD |
| store (DAD), S | Store register S in destination address DAD |
| mov (DAD), (SAD) | Copy data from source address SAD to destination address DAD |
| repeat | Repeat the subsequent instruction a specified times |
| jump condition, D | Jump to address D if specified condition is met (or jump unconditionally when no condition is specified) |
| call D | Call a subroutine starting at address D |
| return | Return from the current subroutine back to the original calling routine |

FIG. 27

63 BRANCH CONDITION

| CONDITION | OPERATION |
|---|---|
| RPCn=val | Decrement RPCn by one, and return True if the resultant RPCn equals val, or False otherwise. |
| RPCn>val | Decrement RPCn by one, and return True if the resultant RPCn is still greater than val, or False otherwise. |

FIG. 28

64 ADDRESS MODIFICATION FUNCTION

| MNEMONICS FOR MODIFYING ADDRESS | OPERATION |
|---|---|
| An++val | Output An as memory address, and add val to An afterwards. |
| An+val | Output (An plus val) as memory address |
| An+Am | Output (An plus Am) as memory address |

FIG. 29

65 EXTENDED REGISTERS

| CLASSIFICATION | REGISTER NAME | REMARKS |
|---|---|---|
| GENERAL-PURPOSE REGISTERS | Rp | p=0,1,2,··· |
| FLAG REGISTER | F | |

FIG. 30

66 EXTENDED INSTRUCTION SET

| INSTRUCTION FORMAT | OPERATION |
|---|---|
| add D,S | Add register S to register D, and set the result status in Flag register |
| sub D,S | Subtract register S from register D, and set the result status in Flag register |

FIG. 31

67 EXTENDED CONDITION

| CONDITION | OPERATION |
|---|---|
| F=cnd | Test whether flag F meets specified condition cnd, where cnd is Z (zero status), NZ (non-zero status), etc. |

FIG. 32

68   DMA PROGRAM

```
set     A0, 0x1000
set     A1, 0x2000
set     rpc0, 10
repeat
mov     (A0++1), (A1++1)
```

FIG. 33

81 DMA REQUEST PARAMETER TABLE

| ITEM | VALUE |
|---|---|
| SOURCE | 0x1000 |
| DESTINATION | 0x2000 |
| TRANSFER DATA SIZE | 256 |
| MODE | MODE1 (RECTANGULAR BLOCK DMA TRANSFER) |
| OPTIONAL PARAMETERS | Width=16<br>Heigth=16<br>Skip=304 |

FIG. 35

82 DMA REQUEST PARAMETER TABLE

| ITEM | VALUE |
|---|---|
| SOURCE | 0x1000 |
| DESTINATION | 0x2000 |
| TRANSFER DATA SIZE | 0x200 |
| MODE | MODE2 (RELATIVE ADDRESSING MODE) |
| OPTIONAL PARAMETERS | - |

FIG. 37

SYSTEM AND METHOD FOR CONTROLLING DMA DATA TRANSFER

This application is a continuing application, filed under 35 U.S.C. §111(a), of International Application PCT/JP2003/002608, filed Mar. 5, 2003.

BACKGROUND OF THE INVENTION

1. Field of the Invention

The present invention relates to a data transfer control system, a direct memory access (DMA) controller, and a DMA data transfer method. More particularly, the present invention relates to a data transfer control system, a DMA controller, and a DMA data transfer method that can change the way of data transfers.

2. Description of the Related Art

There are computer systems that need to process a large amount of data objects while inputting and outputting them at very high speeds. To achieve the purpose, those systems often employ a special data transfer mechanism, other than the main processor for general data processing. This mechanism is known as a direct memory access (DMA) controller. The DMA controller, or DMAC, normally works independently of the main processor to transfer data between different memory areas according to specified source and destination addresses and data size.

The DMAC transfers data while the main processor is engaged in other data processing tasks. It is an advantage of using a DMAC that the main processor is free from the overhead of data transfers. Some DMA architectures include a dedicated memory for a DMAC, so that the DMAC can make access to its dedicated memory without causing contention with main memory access by the main processor. See, for example, Japanese Patent Application Publication No. 7-244632 (1995). This technique provides the main processor with an increased data processing efficiency.

Data objects that a DMAC is supposed to transfer may vary depending on the requirement of each system application. Some systems only require simple memory-to-memory transfers. Others may need to transfer more complex data objects such as data in rectangular areas, or require a sophisticated transfer sequence according to some prescribed rules. Also, the memory addresses are not necessarily fixed, but determined through calculations.

Conventional DMACs have I/O registers for receiving DMA parameters including source address, destination address, and data size. A host processor sets those parameters in the DMAC and then gives a start command to let the specified DMA transfer begin. Such DMACs are implemented as peripheral hardware circuits with fixed functions for use as an independent component or as an integral part of the system chip set. Since the functionality of conventional DMACs is mostly hard-wired, different circuit designs are required for different system applications. For example, some DMACs have a plurality of DMA channels to support parallel data transfers. Other DMACs contain a FIFO buffer to store a queue of DMA requests. Actually, a variety of application-specific DMACs are used in different computer systems.

DMACs with hardware-oriented design, however, are limited in terms of functional flexibility. Some of their functions may be superfluous in a certain class of applications, while they may fail to provide necessary features in other applications. Think of, for example, a system with a four-channel DMAC. While this four-channel design satisfies the system's requirements initially, it is possible that there arises later a need for an application which really uses, say, six DMA channels. Since only four DMA channels are available, and since that number is physically fixed in this case, system engineers have to manage to configure the application with the limited DMA resources. The penalty is an increased processing overhead, which is likely to result in a performance degradation.

Most DMACs are implemented as supplementary circuits that help the main processor in doing tasks. Cost requirements and power consumption requirements of a system impose a limit on DMAC designs. For these reasons, DMACs are only allowed to have relatively simple addressing capabilities, and it is therefore difficult for ordinary DMACs to realize DMA transfers with sophisticated addressing patterns. Some existing DMACs support special addressing, but most of them are designed for particular applications and often inappropriate for other applications.

As described above, existing hardware-implemented DMACs are so simple and limited in their flexibility that they are unable to provide the data transfer patterns required in actual applications. That is, conventional DMACs are designed primarily for use in simple applications. In the case where complex data transfers are required, the main processor executes them with its own data transfer instructions while calculating source and destination addresses. This method, however, consumes much of the computation time of the main processor, thus leading to degradation of system performance.

In view of the above, several researchers have proposed a multi-processor system to make a complex data transfer possible. See, for example, Japanese Patent Application Publication No. 7-13920 (1995). According to this approach, the system employs another microprocessor (sub-processor) other than its main processor. Instead of having a dedicated hardware circuit, the system uses this sub-processor as a DMAC. If its performance is sufficiently high in an intended application, the sub-processor can perform a sophisticated data transfer by generating memory addresses on the fly with its own arithmetic functions. This programmable sub-processor also brings flexibility to DMA functions.

It should be noted that the sub-processor described above is a general-purpose processor. A data transfer using a general-purpose processor takes more steps in calculating memory addresses than a hard-wired DMAC does. More specifically, the sub-processor executes load and store instructions back to back in order to emulate a memory-to-memory data transfer. This means that the source data is once read into a register in the processor and then written in the destination memory. In contrast, a typical hard-wired DMAC can transfer a burst of data directly between memories at a high speed, concentrating on memory address generation and read/write control. Although the sub-processor approach offers higher flexibility, it has an obvious disadvantage in transfer speeds. The cost is another problem of this approach, because a general-purpose processor requires a greater amount of circuit resources than an ordinary single-purpose DMAC does.

According to the multi-processor system disclosed in the second patent literature, all the main processor data, DMA parameters, and sub-processor programs are placed together in a single memory space. The proposed system uses a dual-port random access memory (DPRAM) for this purpose, which accepts simultaneous access from the main processor and sub-processor. The problem is, however, that the sub-processor has to fetch instructions as well as to read and write data through the same port of the DPRAM, thus slowing down the execution speed.

The primary purpose of using a DMAC is to execute data transfers transparently to the main processor's computation (i.e., to parallelize the two processes, ideally with no time wasted). If the sub-processor was slow, a consequent delay of DMA data transfers would hamper the main processor from proceeding to the next task. The speed of DMA transfers is therefore important for the performance of the system.

SUMMARY OF THE INVENTION

In view of the foregoing, it is an object of the present invention to provide a data transfer control system, a DMA controller, and a DMA control method that can change the way of DMA transfers to meet the requirements of each application.

To accomplish the above object, the present invention provides a data transfer control system for transferring data between memory areas. This data transfer control system includes a DMA controller memory storing a DMA program describing how to perform a DMA transfer. The system also includes a DMA controller that performs, in response to a DMA request, a DMA transfer between specified memory areas according to the DMA program stored in the DMA controller memory.

In addition to the above, to accomplish the above object, the present invention provides a DMA controller for controlling DMA transfers. This DMA controller has an instruction decoder and an address generator circuit. The instruction decoder reads each instruction of a DMA program from a DMA controller memory and decodes the instruction to produce control signals. The address generator circuit generates DMA addresses according to the control signals from the instruction decoder.

Further, to accomplish the above object, the present invention provides a method for controlling DMA transfers. This method includes the steps of: (a) providing a dedicated memory for DMA control purposes, the dedicated memory storing a DMA program that describes how to perform a DMA transfer; and (b) performing, in response to a DMA request, a DMA transfer between specified memory areas according to the DMA program stored in said DMA controller memory.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 shows an example data structure of a DMA request parameter table.

FIG. 3 shows an example data structure of a DMA request management table.

FIG. 4 shows an example data structure of a DMA, channel status table.

FIG. 7 shows an example data structure of a channel management table.

FIG. 13 shows an example data structure of a DMA request setting table.

FIG. 18 shows an example of a transfer synchronization table.

FIG. 19 shows an example of a DMA channel status table according to the fifth embodiment.

FIG. 22 shows an example data structure of a memory area management table.

FIG. 26 shows a basic register set.

FIG. 27 shows a basic instruction set that a DMAC can execute.

FIG. 28 shows examples of branch conditions.

FIG. 29 shows address modification functions.

FIG. 30 shows extended registers.

FIG. 31 shows an example of an extended instruction set.

FIG. 32 shows an extended condition.

FIG. 33 is shows an example DMA program.

FIG. 35 shows an example of a DMA request parameter table for transferring a rectangular block.

FIG. 37 shows an example of a DMA request parameter table using relative addressing.

DESCRIPTION OF THE PREFERRED EMBODIMENTS

Figure 1:
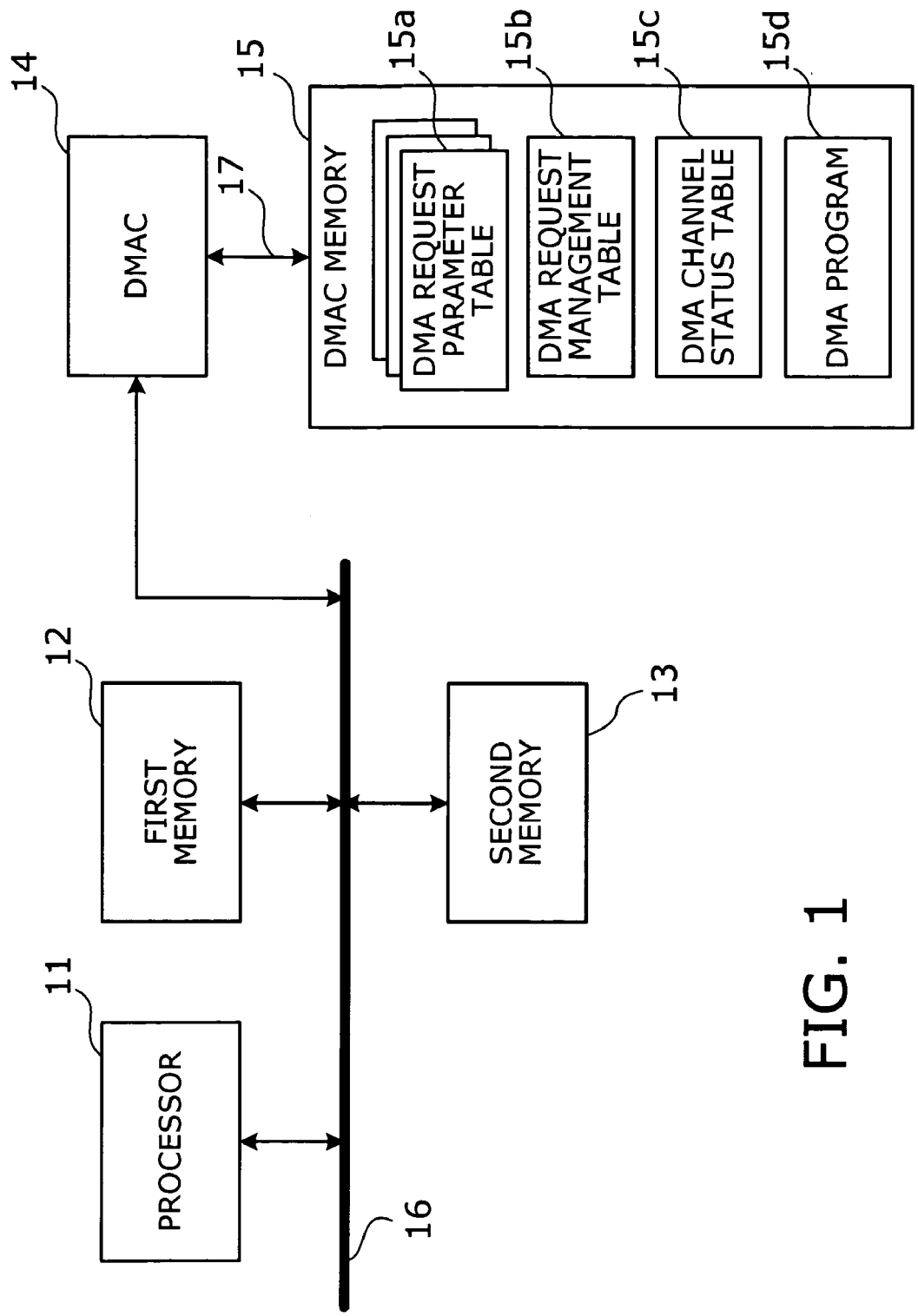
FIG. 1 shows an example system configuration according to a first embodiment of the present invention.

Preferred embodiments of the present invention will be described below with reference to the accompanying drawings, wherein like reference numerals refer to like elements throughout. The description will begin with a basic concept of the invention and then proceeds to more specific embodiments of the invention.

First Embodiment

FIG. 1 shows an example system configuration according to a first embodiment of the present invention. This embodiment represents the basic concept of the invention. In the illustrated system, a processor 11 and first and second memories 12 and 13 are connected to a DMA controller (DMAC) 14 via a bus 16. A DMAC memory 15 is connected to the DMAC 14 through a dedicated bus 17. The processor 11 controls the entire system, using the first and second memories 12 and 13 to store data for system operation. The DMAC 14 is a circuit that controls data transfer between specified memory areas. In response to a DMA request, the DMAC 14 executes a data transfer according to a DMA program 15d and related data stored in the DMAC memory 15. The DMAC 14 is a programmable circuit specially designed for DMA control, which includes an instruction decoder that decodes instructions of the DMA program 15d, and an address generator circuit that produces read and write address signals for use in DMA cycles.

The DMAC 14 of the present embodiment provides enhanced flexibility in DMA transfers mainly because it is designed to operate with a DMA program 15d describing the way of transferring data. The DMA program 15d may contain multiple program modules, from simple transfer patterns to sophisticated transfer patterns (e.g., transferring a rectangular block of memory), thus allowing the DMAC 14 to select and activate appropriate functions according to specified operation modes and the like.

The DMAC memory 15, for use only by the DMAC 14, serves as a storage medium for storing a program to be executed by the DMAC 14, as well as data that the DMAC 14 consults and manipulates in executing the stored program. This DMAC memory 15 stores a program that describes what the DMAC 14 is suppose to do. The DMAC memory 15 also stores several data objects associated with the program. More specifically, DMA request parameter tables 15a are provided for different instances of DMA requests. Other data objects include: a DMA request management table 15b, a DMA channel status table 15c, and a DMA program 15d.

Each DMA request parameter table 15a contains a copy of parameters specified in a received DMA request. The DMA request management table 15b is a list of DMA requests that have been received from the processor 11 or the like. The DMA channel status table 15c stores status information of each individual DMA channel (e.g., whether it is executing data transfer or not). The DMA program 15d is a series of instructions describing what the DMAC 14 is supposed to do.

The DMAC 14 and DMAC memory 15 work together as a DMA data transfer control system in the system described above. The DMAC 14 performs DMA transfers according to the DMA program 15d in the DMAC memory 15. Specifically, when a DMA request is received, the DMAC 14 stores specified parameters in the DMAC memory 15 in the form of a DMA request parameter table 15a. Such DMA requests are queued in the DMA request management table 15b, so that the DMAC 14 processes those requests on, for example, a first-come first-served basis. The DMA channel status table 15c is used to manage the information on a particular DMA request that is in progress.

With the system configuration above, the DMAC 14 of the present invention has its own instruction memory area to store a data transfer program for use in DMA operations. While being capable of decoding and executing program control instructions (e.g., loop control, unconditional jump, conditional branch, and the like) and data transfer instruction, the DMAC 14 is simpler in circuit structure than general-purpose processors because it does not need complicated computational elements such as multipliers or logic operators. Essentially the DMAC 14 has only to work as a sequencer (rather than a computer), which fetches the stored program instructions one by one and controls the ongoing DMA transfer accordingly. The operation sequence of the DMAC 14 can be programmed with various DMA parameters as well. The DMA parameters include source address, destination address, and data size, which are fundamental parameters of DMA transfers. Also, the enhanced programmability of the DMAC 14 of the first embodiment makes it possible to provide extended DMA functions such as variable channels and flexible queue length control, thus solving the problems related to conventional DMACs discussed earlier.

The DMAC memory 15 is implemented with a single-port memory, a dual-port memory, or two separate memories for instructions and data. The latter two options allow the DMAC 14 to fetch instructions in parallel with data read/write operations without causing memory access contentions or suffering consequent wait cycles. As yet another arrangement of data memory for the DMAC 14, an additional data memory area may be disposed on the bus, aside from that in the DMAC memory 15. In that case, the DMAC 14 can perform DMA transfers with reference to either or both of those data memory areas.

The DMAC memory 15 stores various data objects in an organized way. Referring first to FIG. 2, an example data structure of a DMA request parameter table is shown. The illustrated DMA request parameter table 15a has data fields named as follows: "Source," "Destination," "Data Size," "Mode," and "Optional Parameter". These data fields constitute a record of control parameters corresponding to each DMA request that is received.

The source field contains the top address of a memory area from which data will be transferred. The destination field contains the top address of a memory area to which data will be transferred. The data size field specifies the size of data to be transferred. The mode field specifies how a DMA transfer is performed. That is, the DMAC 14 changes the way of transferring data by specifying a different mode. The optional parameter field is for additional parameters (i.e., parameters other than source, destination, and data size) which may be necessary in more sophisticated DMA operations.

FIG. 3 shows an example data structure of the DMA request management table 15b. For each entry of DMA request, the illustrated DMA request management table 15b provides the following data fields: "Request ID," "Pointer," and "Attribute." The request ID field contains the identifier of a registered DMA request, and the pointer field gives the memory address of its corresponding DMA request parameter table 15a. The attribute field contains attributes of the registered DMA request, which include, as shown in FIG. 3, a flag indicating a "valid" or "invalid" status. The "valid" status means that the registered DMA request is waiting for execution, while the "invalid" status indicates that the request is no longer pending (because, for example, the requested DMA transfer has been completed).

FIG. 4 shows an example data structure of the DMA channel status table 15c. The illustrated DMA channel status table 15c has data fields named as follows: "Request Management Table Pointer," "Request in Process," "Source," "Destination," "Remaining Data Size," "Mode," "Optional Parameter." The request management table pointer field gives a memory address that indicates where the corresponding DMA request management table 15b resides. The request-in-process field contains an identifier indicating which DMA request the channel is currently dealing with. The source field shows the next source memory address from which the data is to be transferred. The destination field shows the next destination memory address to which the source data is to be transferred. The remaining data size field indicates the size of remaining data to be transferred. The mode field shows the mode in which the present DMA request is executed. The optional parameter field contains optional parameters specified in the ongoing DMA transfer process.

As can be seen from the above, the DMA channel status table 15c shows the operating status of the DMAC 14; i.e., it indicates which DMA requests in the DMA request management table 15b are completed and which DMA request is currently in progress. Each table discussed above takes; up some amount of memory space, and the number of tables is limited ultimately by the capacity of the memory that is actually mounted. Generally a sufficiently large number of tables can be provided in an allocated memory space, so that the DMAC 14 can serve many DMA transfer requests.

A DMA program 15d is compiled beforehand and stored in the DMAC memory 15 for use by the DMAC 14 in the above-described system. When there arises a need for a DMA transfer, the processor 11 issues a DMA request to the DMAC 14, specifying a set of DMA parameters. Upon receipt of this DMA request, the DMAC 14 saves the specified request parameters in a DMA request parameter table 15a and then adds it to the DMA request management table 15b as a new entry. The added DMA request entry includes a pointer to that DMA request parameter table 15a, as well as an attribute with a value of "valid." This newly registered valid DMA request in the DMA request management table 15b causes the DMAC 14 to start a DMA transfer according to the DMAC memory 15 in the way described in the next paragraph.

Figure 5:
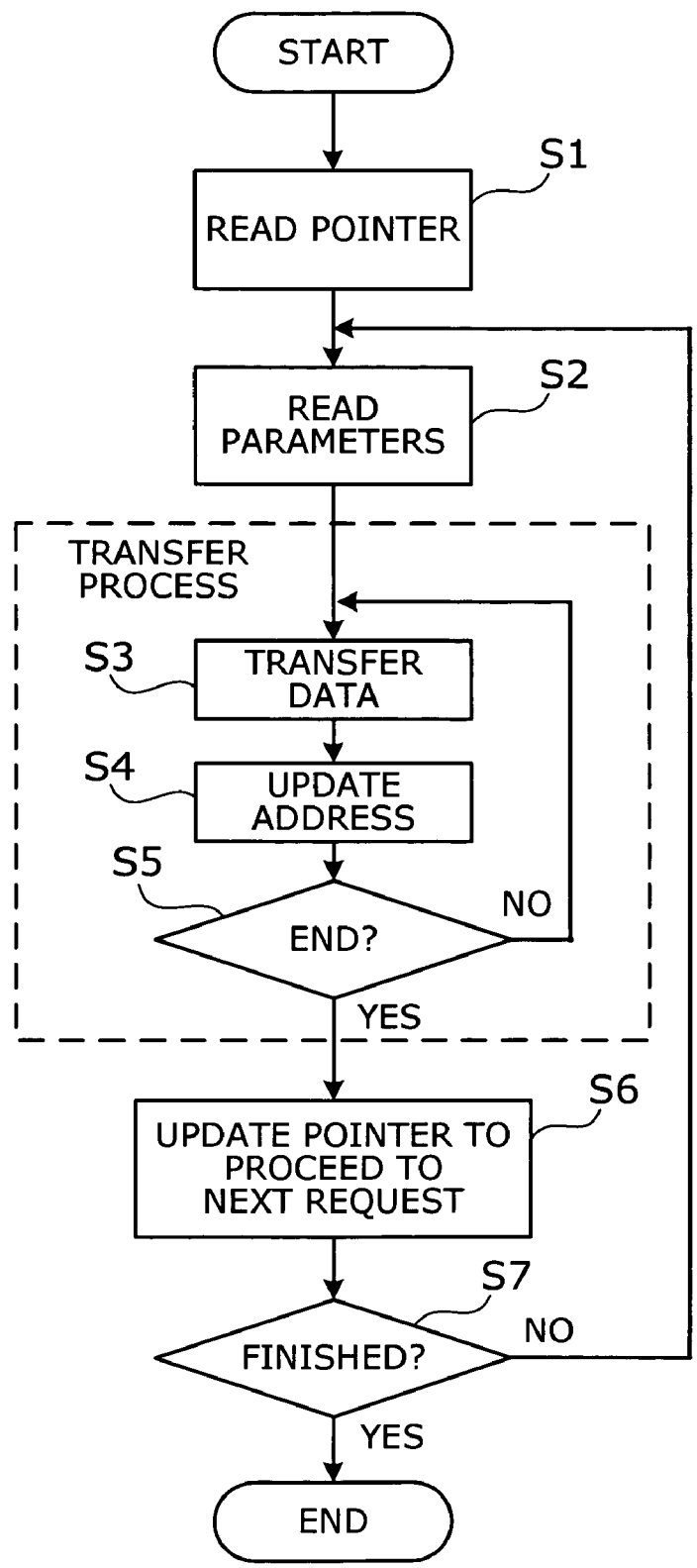
FIG. 5 is a flowchart of a data transfer program to be executed by a DMAC.

FIG. 5 is a flowchart of a data transfer program that the DMAC 14 executes. This process, invoked when a new DMA request is registered with the DMA channel status table 15c, includes the following steps:

(Step S1) Out of the DMA channel status table 15c, the DMAC 14 reads a pointer to a corresponding DMA request management table 15b. The DMAC 14 then identifies a currently available DMA request by referring to the first entry of the DMA request management table 15b.

(Step S2) The DMAC 14 reads out the current DMA request parameters from the DMA channel status table 15c.

(Step S3) According to the parameter values read at step S2, the DMAC 14 transfers a unit amount of data (e.g., one byte). After that, the DMAC 14 updates the remaining data size field of the DMA channel status table 15c by subtracting the unit amount from the current field value.

(Step S4) The DMAC 14 further updates the source and destination address fields of the DMA channel status table 15c by adding the unit amount to the current address values.

(Step S5) The DMAC 14 examines the end condition of DMA transfers. In other words, it tests whether the specified amount of data has all been transferred. If the remaining data size field in the DMA channel status table 15c is zero, the DMAC 14 determines that the end condition is met, thus proceeding to step S6. If not, the process returns to step S3 to continue the present data transfer.

(Step S6) The DMAC 14 updates the pointer to proceed to the next request registered in the DMA request management table 15b, if any.

(Step S7) The DMAC 14 checks whether all DMA requests are processed. If there is no remaining request, the present process is terminated. If there is a pending request, the process returns to step S2 to execute that DMA request. To do so, the DMAC 14 refreshes the DMA channel status table 15c with the next DMA request queued in the DMA request management table 15b.

Through the above-described steps, the DMAC 14 executes DMA transfers according to the DMA program 15d in the DMAC memory 15. The use of a DMA program in the present embodiment brings more flexibility to DMA control, which makes it easy for the same DMAC to provide different DMA transfer functions, besides handling a sufficiently large number of DMA requests. This is unlike the conventional hard-wired DMACs, which can only manage a limited number of DMA requests because their request queue buffer is implemented as a hardware circuit and its capacity is therefore limited (e.g., several to ten-odd requests).

The enhanced functional flexibility described above enables, for example, the number of DMA channels to be varied easily by changing DMA programs. The present embodiment manages the information about each DMA channel in the form of a DMA channel status table, any number of channels can be implemented by creating as many tables as required, although FIG. 1 shows only one.

The flowchart of FIG. 5 assumes that the DMAC 14 uses a simple data transfer instruction that transports a single unit of data (e.g., one byte) at a time, as opposed to a burst data stream. It is not intended, however, to limit the capability of the present embodiment to that assumption. Rather, the DMAC 14 will be able to perform a burst data transfer if the DMA program 15d is written with burst transfer instructions.

To make access to a particular set of DMA request parameters, the present embodiment uses a pointer that indicates the memory address of those parameters. This method makes it easy to define in table form a series of DMA transfers with a fixed pattern. More specifically, think of a case where it is necessary to repeat a DMA transfer from the same source area to the same destination area. Such a fixed-pattern DMA transfer can be recalled easily by entering to the DMA request management table 15b a pointer to the fixed set of DMA request parameters. The use of pointers in this way will eliminate the need for setting the same DMA request parameters each time a data transfer is performed.

The system of FIG. 1 differs from conventional systems in the following points. First, conventional hard-wired DMACs have only a prescribed number of DMA channels that accept a prescribed number of DMA requests. By contrast, the programmable DMAC 14 according to the first embodiment offers a request queue that accepts as many requests as the memory space allows. The depth of the queue is practically unlimited; there is no need for stringent restrictions on incoming DMA requests. Second, the use of a general-purpose processor for DMA functions tends to lead to an overdesigned, costly system. The DMAC 14 of the first embodiment, on the other hand, generates DMA address with a memory address generator and other circuits which are less complex and less costly than general-purpose processors.

Second Embodiment

This section describes a second embodiment of the present invention, which allows the number of DMA channels to be varied easily. Generally speaking, different system applications require different numbers of DMA channels. However, ordinary hard-wired DMA functions can only provide a fixed number of channels. This means that, in some cases, existing DMAC devices offer more DMA channels than required, or in other cases, they are unable to provide a required number of channels, thus imposing an increased load on the host processor in managing many DMA requests with an insufficient number of channels.

The second embodiment of the present invention offers multi-channel DMA transfer capabilities by using a DMA request management table of the first embodiment to control each DMA channel, as well as newly employing a channel management table to manage a plurality of DMA request management tables created in a DMAC memory area. Within the limit of memory capacity, the DMAC can manage and control any number of channels corresponding to DMA request management tables.

Figure 6:
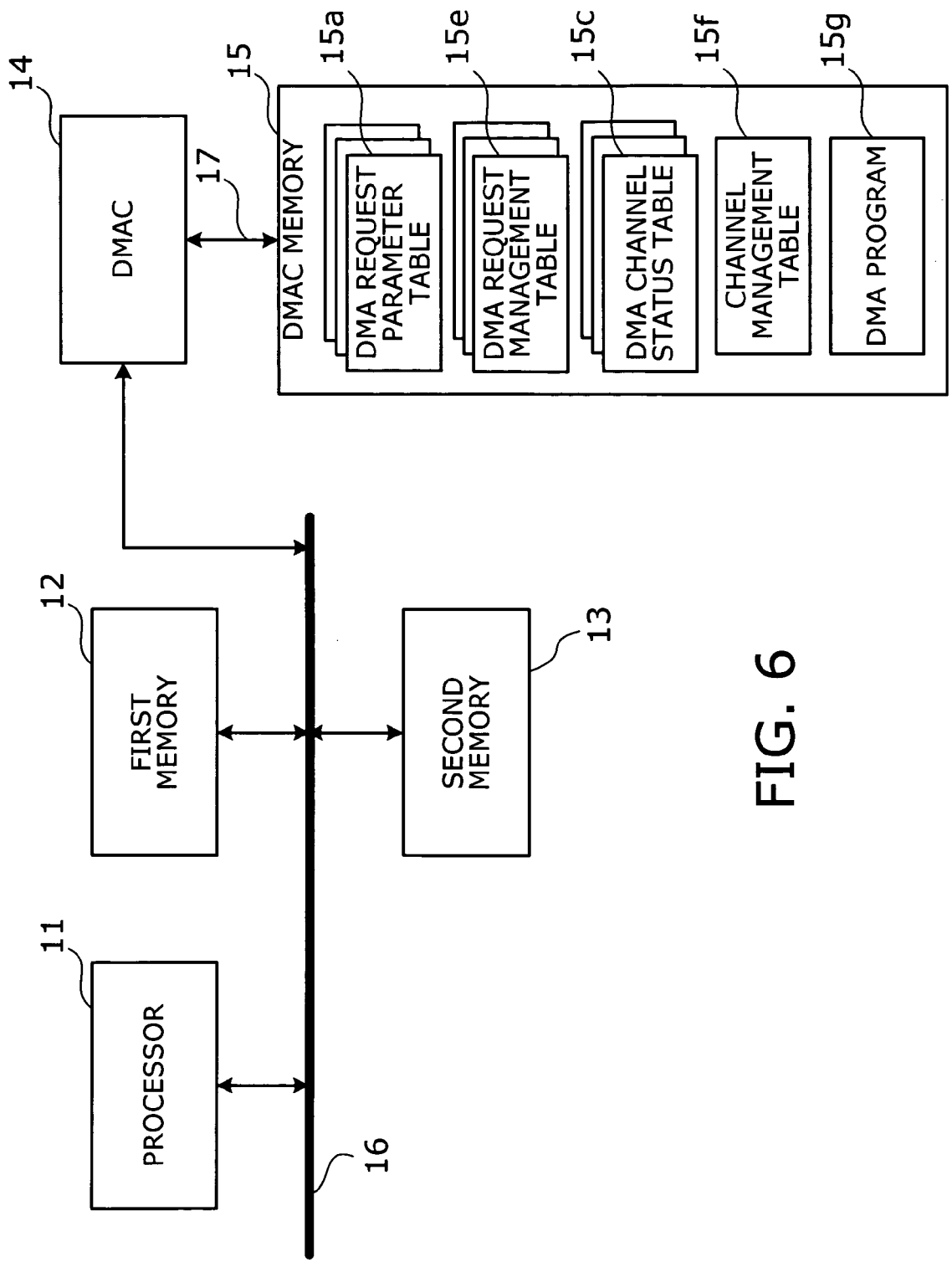
FIG. 6 shows an example system configuration according to a second embodiment of the present invention.

FIG. 6 shows an example system configuration according to the second embodiment outlined above. Since the second embodiment assumes a similar system structure to that of the first embodiment discussed in FIG. 1, this section will focus on distinctive features of the second embodiment, while affixing like reference numerals to like elements.

Specifically, the second embodiment differs from the first embodiment in what the DMAC memory 15 contains. As can be seen from FIG. 6, the second embodiment employs a plurality of DMA request management tables 15e in the DMAC memory 15. The DMAC memory 15 also contains a channel management table 15f, which is not present in the first embodiment of FIG. 1. Further, the DMAC memory 15 stores a DMA program 15g that describes how the DMAC 14 should perform DMA functions according to the second embodiment.

The DMA request management tables 15e are each dedicated to individual DMA channels, with the same data structure as the DMA request management table 15b of the first embodiment shown in FIG. 3. The channel management table 15f contains channel management information (e.g., channel pointers) used to manage a plurality of DMA channel status tables 15c.

FIG. 7 shows an example data structure of the channel management table 15f. This channel management table 15f has the following data fields for each entry: "Record Number," "Channel Pointer," and "Attribute." The record number field contains an identifier of each record entry. The channel pointer field gives a memory address for making access to a particular DMA channel status table 15c, where each DMA channel status table 15c provides a request management table pointer that points to a corresponding DMA request management table 15e (see FIG. 4). The attribute field shows whether the record is valid or invalid. The channel management table 15f configured in this way is used to manage the information on a plurality of DMA channel.

Figure 8:
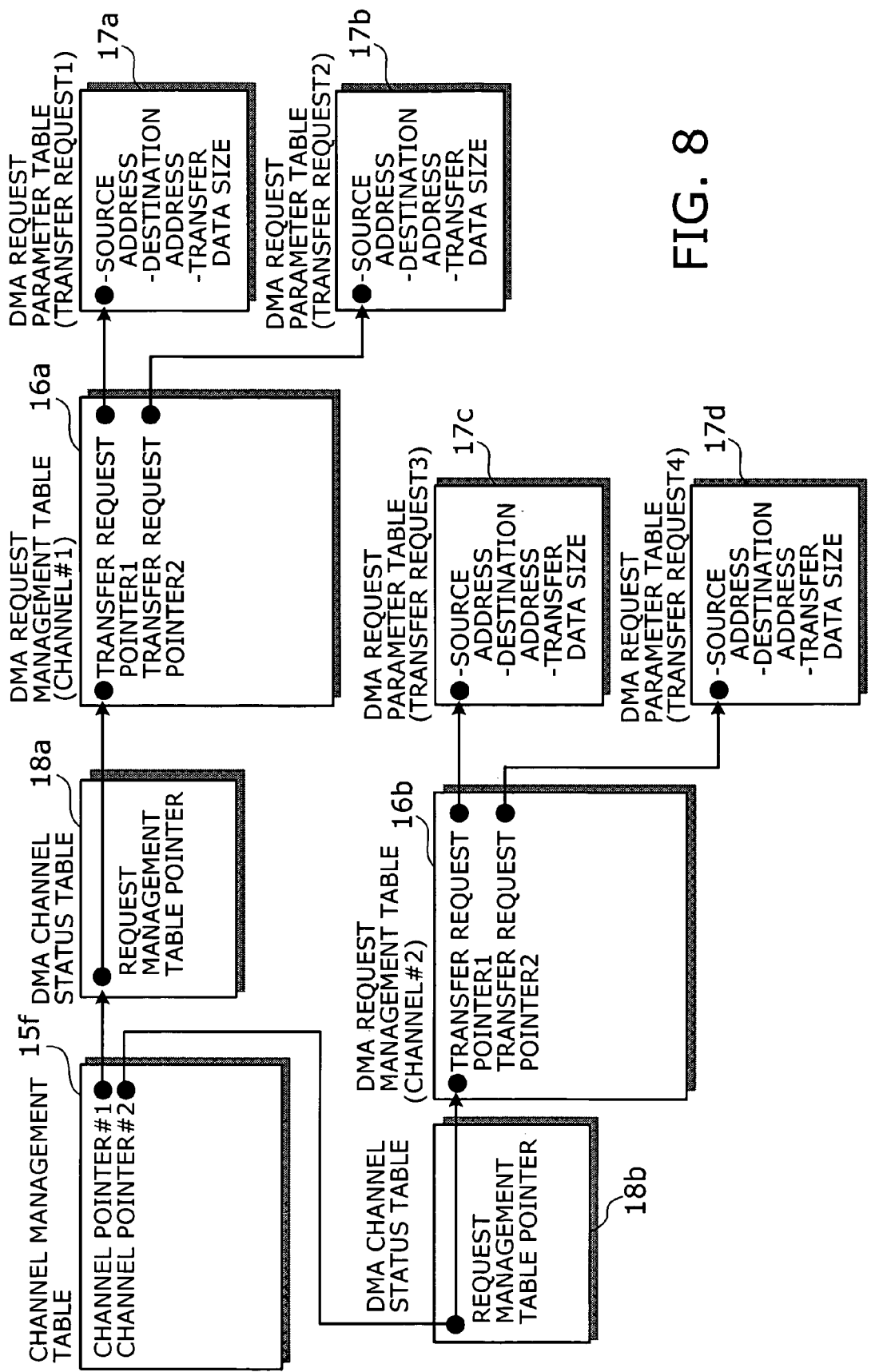
FIG. 8 shows the concept of channel management.

FIG. 8 shows the concept of channel management by way of example. In this FIG. 8, two DMA channel status tables 18a and 18c are registered in a channel management table 15f in the form of channel pointers #1 and #2, and the DMA channel status tables 18a and 18c each contain a pointer to their corresponding DMA request management tables 16a and 16b. Further, the channel#1 DMA request management table 16a contains pointers to two different DMA request parameter tables 17a and 17b. Likewise, the channel#2 DMA request management table 16b contains pointers to two different DMA request parameter tables 17c and 17d.

The number of registered DMA request management tables means the number of DMA channels under control of the DMA program 15g. Each DMA request management table works in the way described earlier; that is, it is used to execute incoming DMA requests sequentially with one DMA channel.

As FIG. 8 illustrates, a plurality of DMA channels are controlled by using various tables that are linked by pointers in a hierarchical manner. The detailed operation of each DMA channel is the same as that in the first embodiment. Each channel may have more than two pending DMA requests, and in such cases, it processes them sequentially in accordance with, for example, predetermined priority rules.

A DMA program may be written in such a way that it starts a DMA transfer upon receipt of a table pointer. This program makes it easy to repeat similar DMA transfer cycles with a particular pattern. It will also allow a plurality of channels to share a single definition of a DMA transfer pattern (e.g., by letting each channel own and manage a pointer to the beginning of the shared table, as well as an index pointer for selecting a particular part of the table).

Figure 9:
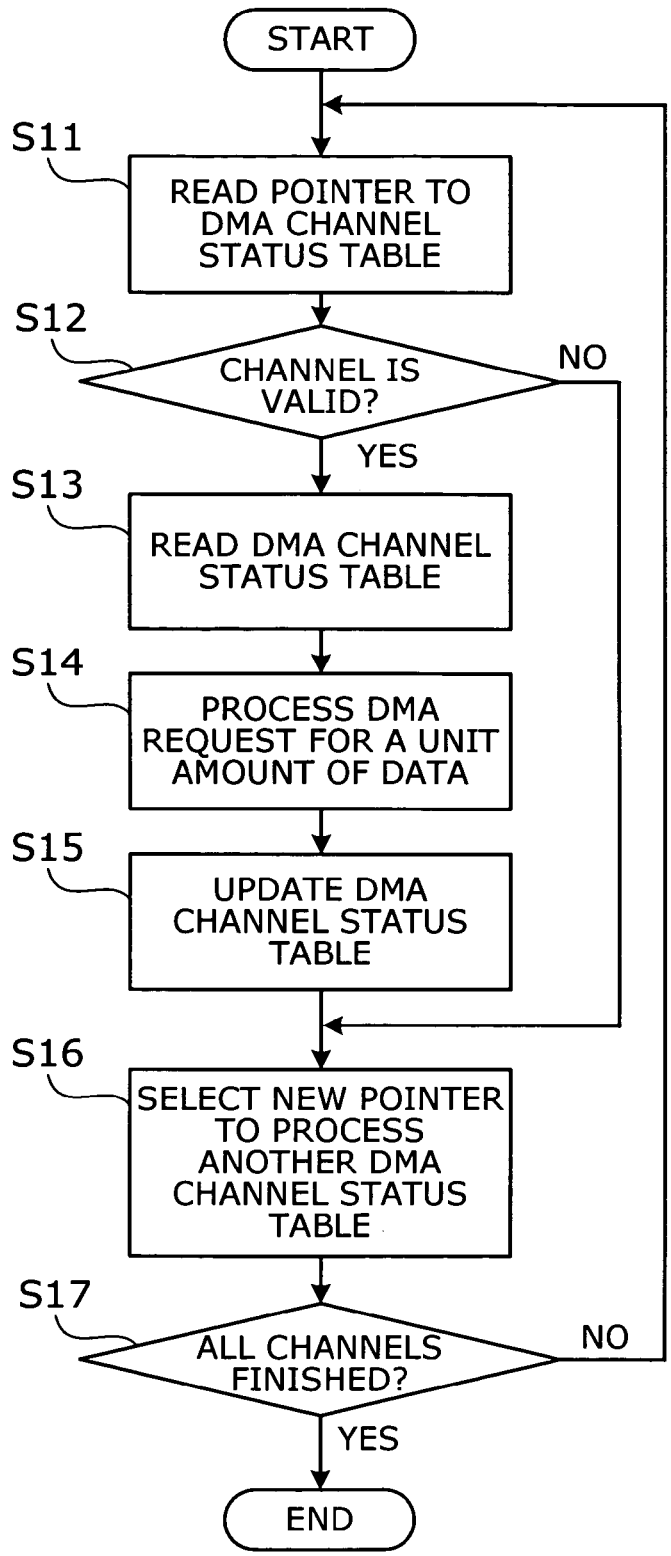
FIG. 9 is a flowchart showing how a plurality of DMA channels are handled.

FIG. 9 is a flowchart showing how a plurality of DMA channels are handled. In short, the DMAC 14 takes a time-sharing approach in processing pending requests in each DMA channel. That is, it serves multiple DMA channels equally, transferring one unit of data at a time. The process of FIG. 9 includes the following steps:

(Step S11) The DMAC 14 retrieves one pointer out of the channel management table 15f, which points to one of the DMA channel status tables 15c.

(Step S12) The DMAC 14 then looks into the DMA channel status table 15c pointed by the retrieved pointer, thus examining the current attribute value of the channel in question. If the channel is flagged as "valid," then the process advances to step S13. If it is flagged as "invalid," then the process skips to step S16.

(Step S13) The DMAC 14 examines the DMA channel status table 15c to figure out the current status of the ongoing DMA request.

(Step S14) Based on the ongoing DMA request information in the retrieved DMA channel status table 15c, the DMAC 14 performs a DMA transfer of one unit amount of data.

(Step S15) The DMAC 14 updates the DMA channel status table 15c with new address field values and the like.

(Step S16) The DMAC 14 seeks another pointer in the channel management table 15f to select a DMA channel status table 15c corresponding to the next channel.

(Step S17) The DMAC 14 checks whether all DMA channels are processed. If not, the process returns to step S11. If all channels are finished, it means that the DMAC 14 has completed one scanning cycle for the multiple DMA channels.

As in the first embodiment, the above steps are executed cyclically to process every DMA request pending in each channel. When all DMA requests for a certain channel are finished, the channel attribute is changed from "valid" to "invalid," which allows the DMAC 14 to skip that channel until a new DMA request comes to that channel. If all valid channels have disappeared from the list in the channel management table 15f, it indicates that the DMAC 14 has no further tasks to perform.

While the multi-channel DMA process of FIG. 9 assumes equal priorities of channels, the present invention should not be limited to this implementation. DMA channels may have different priorities when the DMAC 14 processes their requests.

Regarding the management of channel resources in executing DMA transfers, the second embodiment described above is different from conventional hard-wired DMACs in the following ways: Ordinary hard-wired DMACs execute DMA requests queued in each DMA channel. In the case where a fixed memory block is frequently transferred, it would be sensible to assign a fixed DMA channel to those DMA requests, so that the same parameters can be reused as much as possible. However, this is only possible if the DMAC offers sufficient channel resources. Otherwise, one DMA channel should serve two or more purposes, meaning that DMA parameters set in one channel are overwritten each time that channel serves another kind of DMA request. The task of reconfiguring DMA channels incurs processing overhead.

In the same situation as above, the second embodiment of the invention would process DMA requests of each channel in a time-shared fashion by using a channel management table 15f. The channel management table 15f indicates the state of each channel. When one "valid" channel has a pending DMA request, the DMAC 14 serves that channel by transferring one unit amount of data and then turns to another "valid" channel.

The DMAC 14 serves all channels equally in this way. The channel management table 15f plays a key role in addition and deletion of DMA channels. Specifically, a channel can be activated by setting a "valid" status to a corresponding table entry. When all the pending DMA requests of that channel are finished, the channel is given a "complete" status.

As can be seen from the above, the second embodiment facilitates reconfiguring DMA channels, including adding and deleting channels, as well as registering and deregistering them to/from a channel management table. This feature of the second embodiment eliminates the need for setting the same parameters again and again to deal with a frequent data transfer pattern. Instead, a dedicated channel and its parameters are defined and recorded permanently in the DMAC memory, and this channel is registered with the channel management table, so that it can be activated or deactivated as necessary. Since most setups are ready, the overhead of just activating and deactivating this channel is therefore very small, which is an advantage of the DMAC architecture of the second embodiment over the conventional hard-wired DMACs.

Third Embodiment

Figure 10:
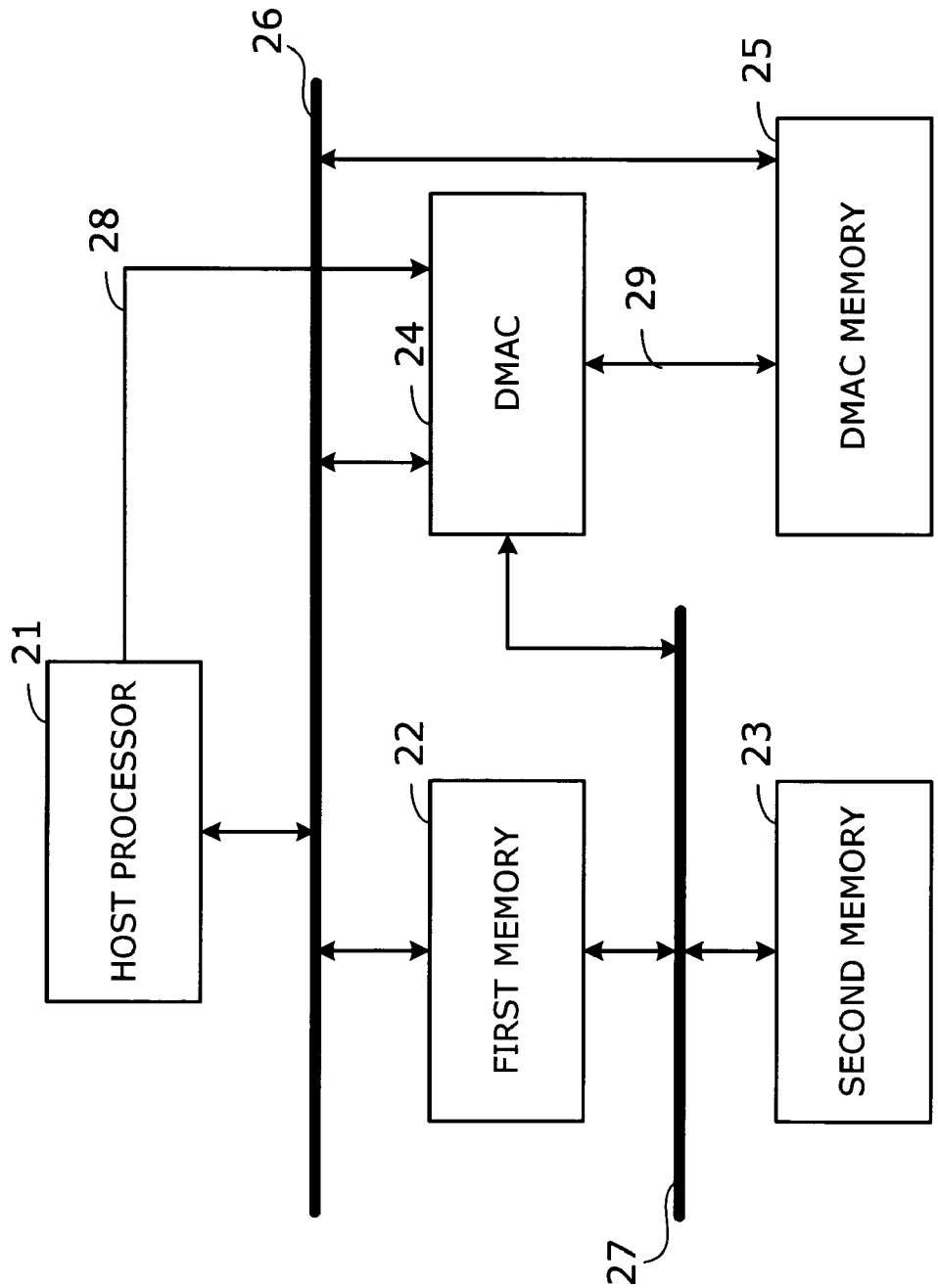
FIG. 10 shows an example system configuration according to a third embodiment of the present invention.

This section describes a third embodiment of the present invention, which focuses on how a host processor is involved in the control of a DMAC. FIG. 10 shows an example system configuration according to the third embodiment of the invention. In this system, a host processor 21 is connected to a first memory 22, a DMAC 24, and a DMAC memory 25 through a first bus 26. The host processor 21 is also coupled directly to the DMAC 24 through a special bus 28. A second memory 23 is disposed on another bus 27, and the first memory 22 and DMAC 24 are coupled to this second memory 23 via that second bus 27. The DMAC 24 is further coupled to a DMAC memory 25 via a bus 29. The special bus 28 is used to send and receive control signals including a reset signal and transfer completion signal, allowing the host processor 21 to make access to the DMAC memory 25 so as to change DMA programs and control DMA transfer timings.

Conventional hardware-implemented DMACs cannot change their functions even when the system is stopped, let alone during system operation. By contrast, the third embodiment shown in FIG. 10 permits the host processor 21 to deactivate the DMAC 24 temporarily, change DMA programs, and restart the DMAC 24. The third embodiment also enables fine control of timings by giving an appropriate DMA program including a code that causes the DMAC 24 to execute DMA transfers in synchronization with the host processor 21.

Figure 11:
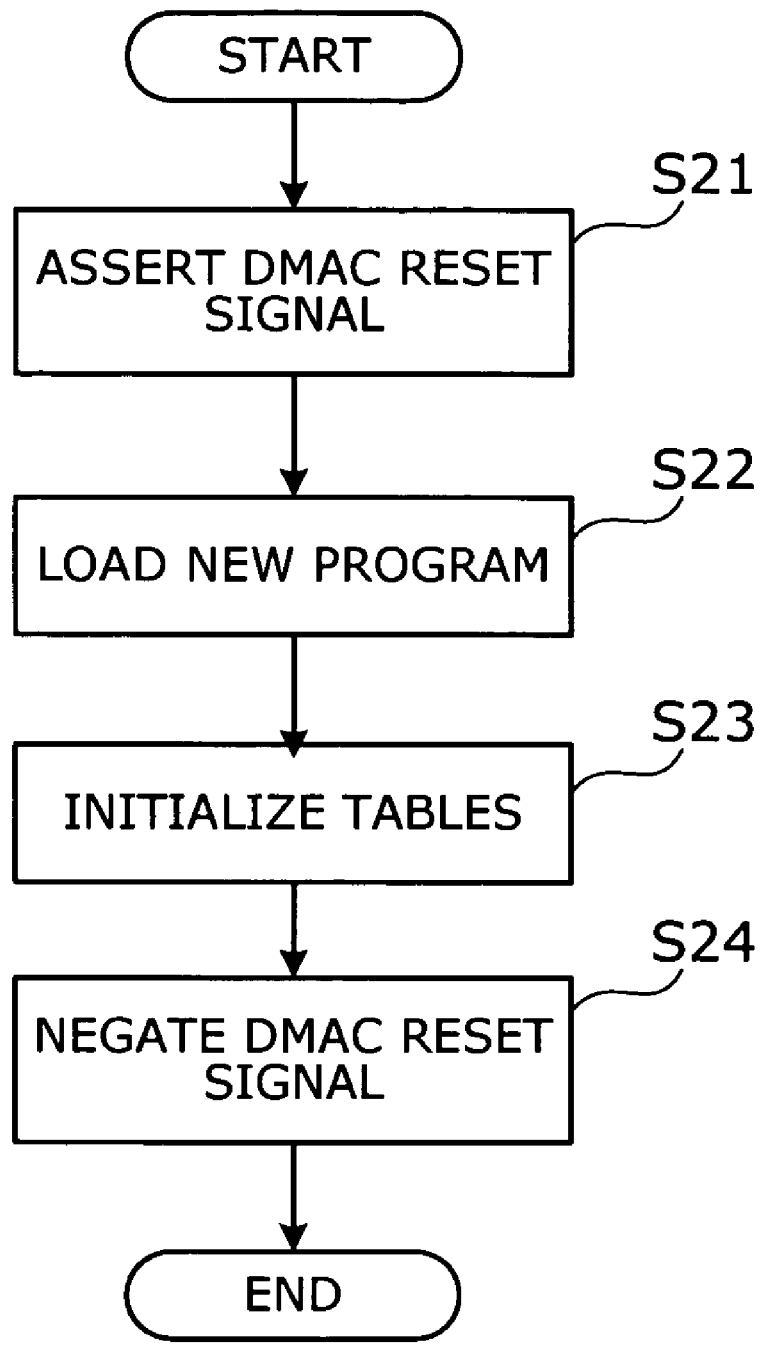
FIG. 11 is a flowchart of a process to change programs during operation.

FIG. 11 is a flowchart showing how the DMA programs are changed during operation. This process includes the following steps:

(Step S21) The host processor 21 asserts a reset signal on the special bus 28 to deactivate the DMAC 24.

(Step S22) The host processor 21 loads the DMAC memory 25 with a new DMA program while the DMAC 24 is stopped.

(Step S23) The host processor 21 initializes various tables in the DMAC memory 25.

(Step S24) The host processor 21 negates the reset signal, thereby enabling the DMAC 24 to start operation.

DMA programs are changed in the way described above, and afterwards the host processor 21 encounters an event that needs a DMA transfer. The host processor 21 first fills out a DMA request parameter table with DMA request parameters necessary for the data transfer. In the case the request is directed to an existing DMA channel, the host processor 21 saves the DMA request parameter table to the DMAC memory 25 and appends a new pointer to the end of a corresponding DMA request management table so as to register the created DMA request parameter table with that DMA channel.

Otherwise, if the DMA request is directed to a new channel, then the host processor 21 creates a new DMA request management table. After entering this DMA request parameter table to the DMAC memory 25, the host processor 21 places a pointer in the new DMA request management table so as to register the DMA request parameter table at hand.

The first thing that the DMA program does upon startup, or when it enters a state waiting for a DMA request, is to check the channel management table. The DMA program starts a DMA transfer operation when a pointer to a DMA channel status table is found in the channel management table. For details of the data transfer operation, see the description of the second embodiment. The optional parameter field of the DMA request parameter table may include an option of transfer completion notification. When a requested data transfer is finished, the DMAC 24 so informs the host processor 21, if this option is set.

Fourth Embodiment

This section describes a fourth embodiment of the present invention, in which the host processor can interact with a DMAC through an interface that is compatible with that of conventional DMACs. The fourth embodiment allows the host processor to invoke a DMA transfer by setting a source address, destination address, data size, and other parameters and issuing a transfer start command in the same way as with a conventional hardware-implemented DMAC. Compatibility in the parameter interface permits the proposed DMA data transfer system (i.e., DMAC and DMAC memory) to be incorporated into an existing system without the need for modifying host programs.

Figure 12:
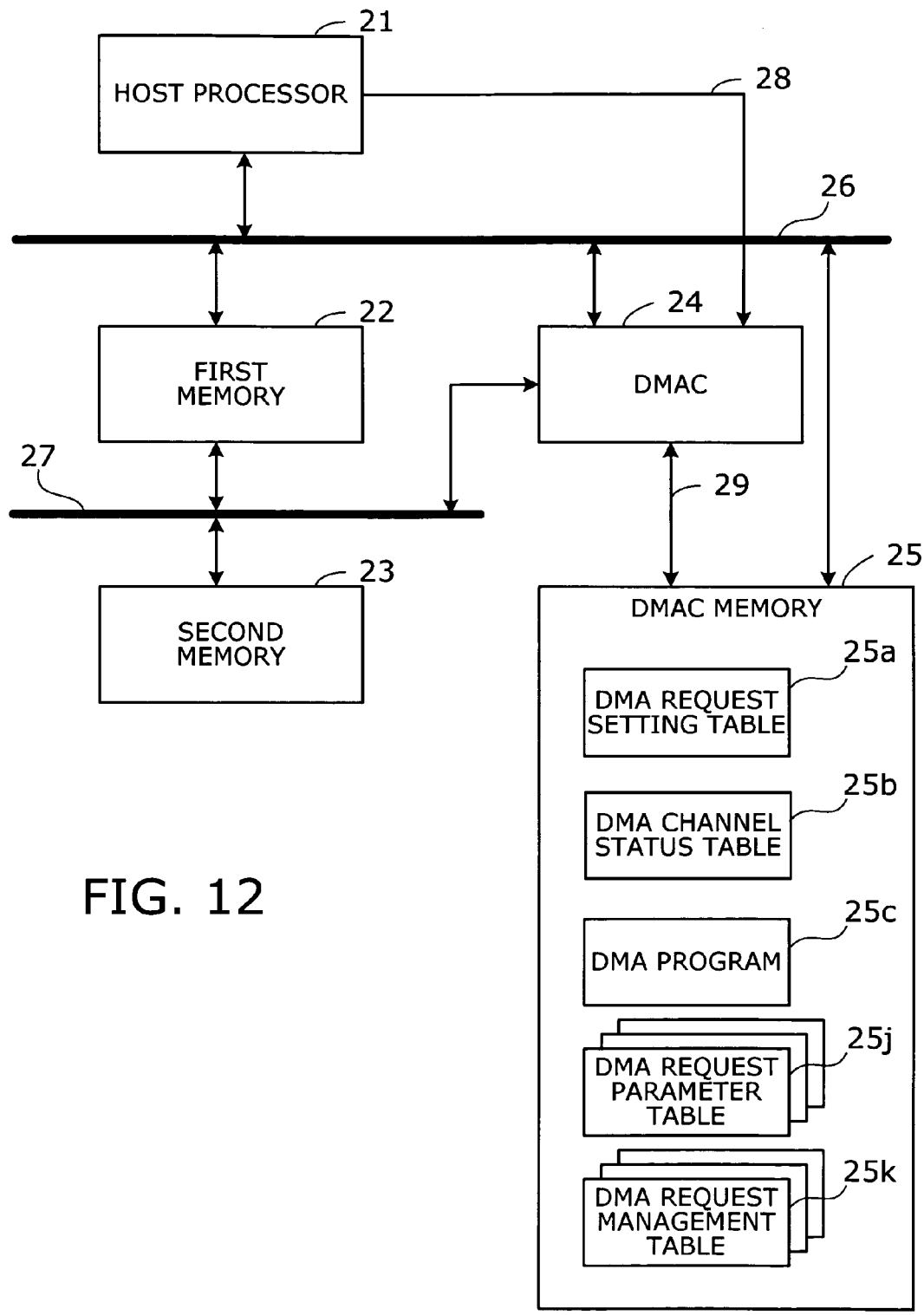
FIG. 12 shows an example system configuration according to a fourth embodiment of the present invention.

FIG. 12 shows an example system configuration according to the fourth embodiment of the present invention. Since the fourth embodiment assumes a similar system structure to that of the third embodiment discussed in FIG. 10, this section will focus on distinctive features of the fourth embodiment, while affixing like reference numerals to like elements.

Specifically, the fourth embodiment differs from the third embodiment in what the DMAC memory 25 contains. According to the fourth embodiment, its DMAC memory 25 contains the following data objects: a DMA request setting table 25a, a DMA channel status table 25b, a DMA program 25c, a plurality of DMA request parameter tables 25j, and a plurality of DMA request management tables 25k. The DMA channel status table 25b, DMA request parameter tables 25j, and DMA request management tables 25k work in the same way as their identically-named counterparts in the second embodiment of FIG. 6. The DMA request setting table 25a is where DMA request parameters of each channel are registered. The DMA program 25c is a program with which the DMAC 24 functions in accordance with the fourth embodiment.

Conventional hard-wired DMACs have I/O registers generally mapped on a memory address space, and parameters for a DMA transfer are set to those I/O registers. The fourth embodiment maintains this I/O register model as an interface for DMA parameter setting, while providing the benefits of functional flexibility of the programmable DMAC 24.

FIG. 13 shows an example data structure of the DMA request setting table 25a. This DMA request setting table 25a is placed on an address space of the DMAC memory 25 so as to implement a DMA parameter table mapped on conventional I/O registers. As FIG. 13 shows, the DMA request setting table 25a has the following data fields for each DMA channel: "Channel No." "Status," "Source," "Destination," and "Data Size." The channel number field shows the identifier of a channel. The status field shows whether the channel is ready to accept a DMA request. The source field contains the top address of a memory area from which data will be transferred. The destination field contains the top address of a memory area to which data will be transferred. The data size field gives the size of data to be transferred.

Figure 14:
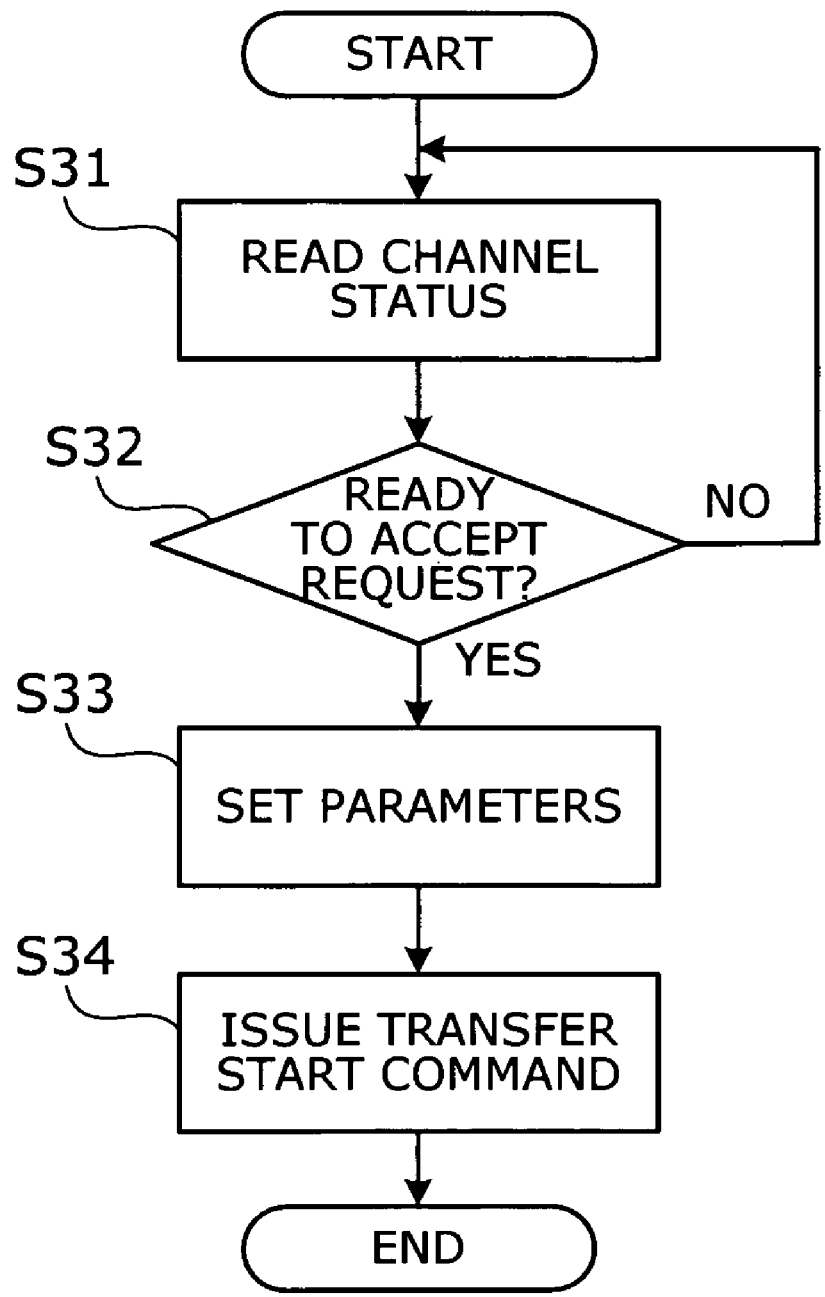
FIG. 14 is a flowchart showing how a host processor invokes a DMA transfer.

FIG. 14 is a flowchart showing how a host processor initiates a DMA process according to the fourth embodiment. This process includes the following steps:

(Step S31) With reference to the DMA request setting table 25a, the host processor 21 reads the status of a DMA channel to be used.

(Step S32) Based on the channel status read out of the DMA request setting table 25a, the host processor 21 determines whether the channel is ready to accept a DMA request. If it is ready, the process advances to step S33. If not, the process goes back to step S31 and repeats status polling until an affirmative result is produced at step S32.

(Step S33) The host processor 21 fills out relevant data fields of the DMA request setting table 25a with parameters necessary for the planned DMA transfer, including source address, destination address, and data size.

(Step S34) To activate the intended DMA channel, the host processor 21 writes a DMA transfer start command to the corresponding status field of the DMA request setting table 25a.

Figure 15:
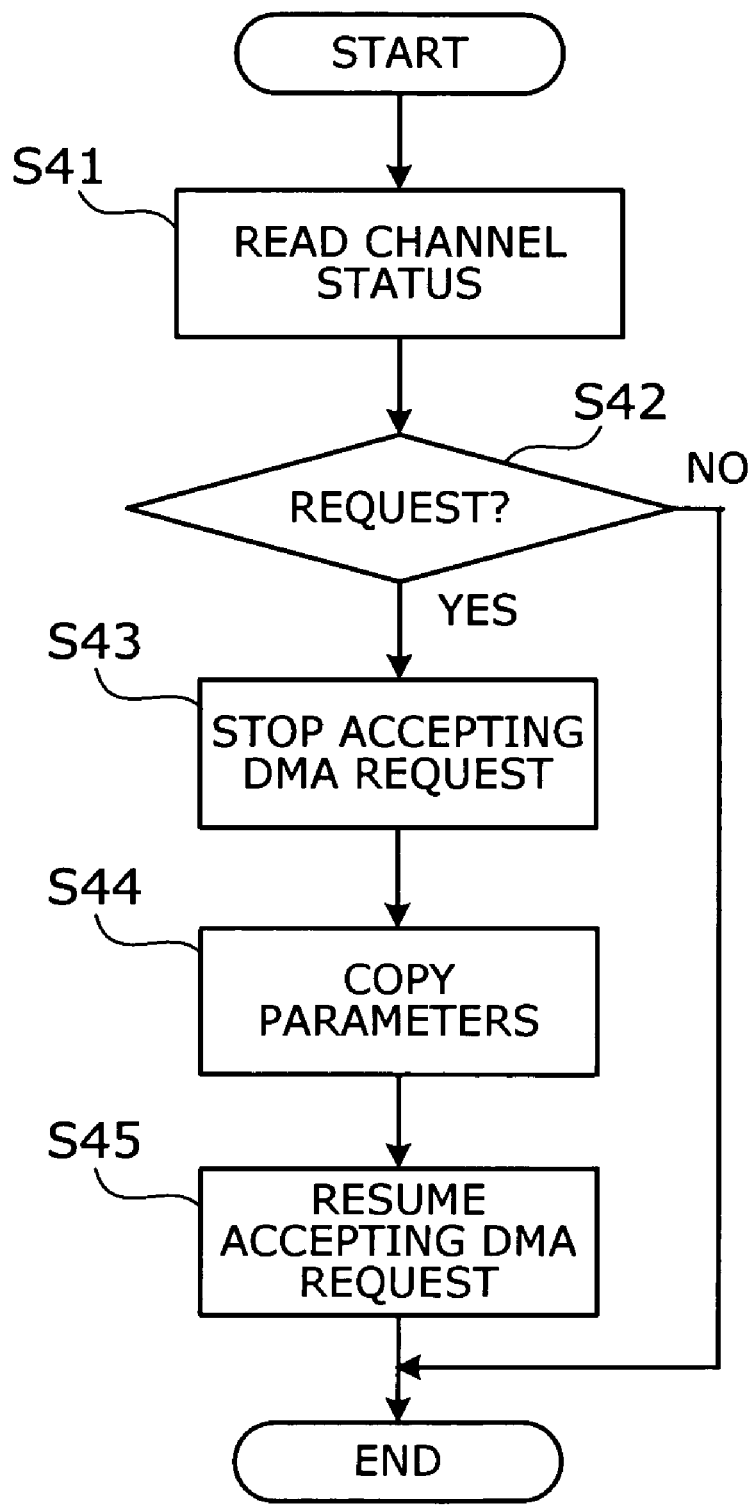
FIG. 15 is a flowchart showing how the DMAC polls a DMA request.

Through the above-described steps, the host processor 21 submits a DMA, request to the DMAC 24. The DMAC 24, on the other hand, polls a DMA request at predetermined intervals during idle times between DMA cycles. FIG. 15 is a flowchart of this request polling process, which includes the following steps:

(Step S41) The DMAC 24 reads the status of each channel shown in the DMA request setting table 25a.

(Step S42) Based on the channel status, the DMAC 24 determines whether there is an active DMA request. More specifically, the DMAC 24 identifies the presence of a DMA request when it finds a DMA transfer start command in the status field of a particular channel. If there is a DMA request, the process advances to step S43. If not, the present process is terminated.

(Step S43) The DMAC 24 changes the status field value of that channel to indicate that no DMA requests can be accepted at the moment.

(Step S44) The DMAC 24 copies channel parameters from the DMA request setting table 25a to a DMA request parameter table 25j.

(Step S45) The DMAC 24 resets the status field to indicate that the channel is ready to accept a new DMA request.

As can be seen from the above, the DMAC 24 uses its idle time to poll the status of each channel in an attempt to check the presence of a new DMA request (transfer start status). When a request is present, the DMAC 24 copies given parameters to a DMA request parameter table 25j corresponding to the specified channel and resets the status of that channel in the DMA request setting table 25a to a "ready to accept" state. After that, the DMAC 24 returns to a normal mode for processing a data transfer sequence, thus executing the newly registered DMA request according to a procedure defined in the DMA program 25c.

The host processor 21 passes DMA transfer parameters to the DMAC 24 through a table-like interface that mimics conventional I/O registers. This compatibility in interface permits the host processor 21 to control the DMAC 24 without the need for modifying existing program codes.

The conventional, hardware-oriented DMAC design employs a parameter table implemented as I/O registers or the like, and parameters for a DMA transfer are set to those I/O registers. A host processor writes DMA request parameters in those I/O registers, together with a start command, which causes the DMAC to perform a DMA transfer accordingly. By contrast, the system according to the fourth embodiment places a DMA request setting table 25a on the DMAC memory 25, so that the host processor 21 can write parameters in that table area. The DMAC 24 watches the content of the table in an attempt to detect a request, and if an active DMA request is identified, it commences a DMA transfer according the request. This method permits the host processor 21 to control DMA functions in the same way as with a conventional system.

Figure 16:
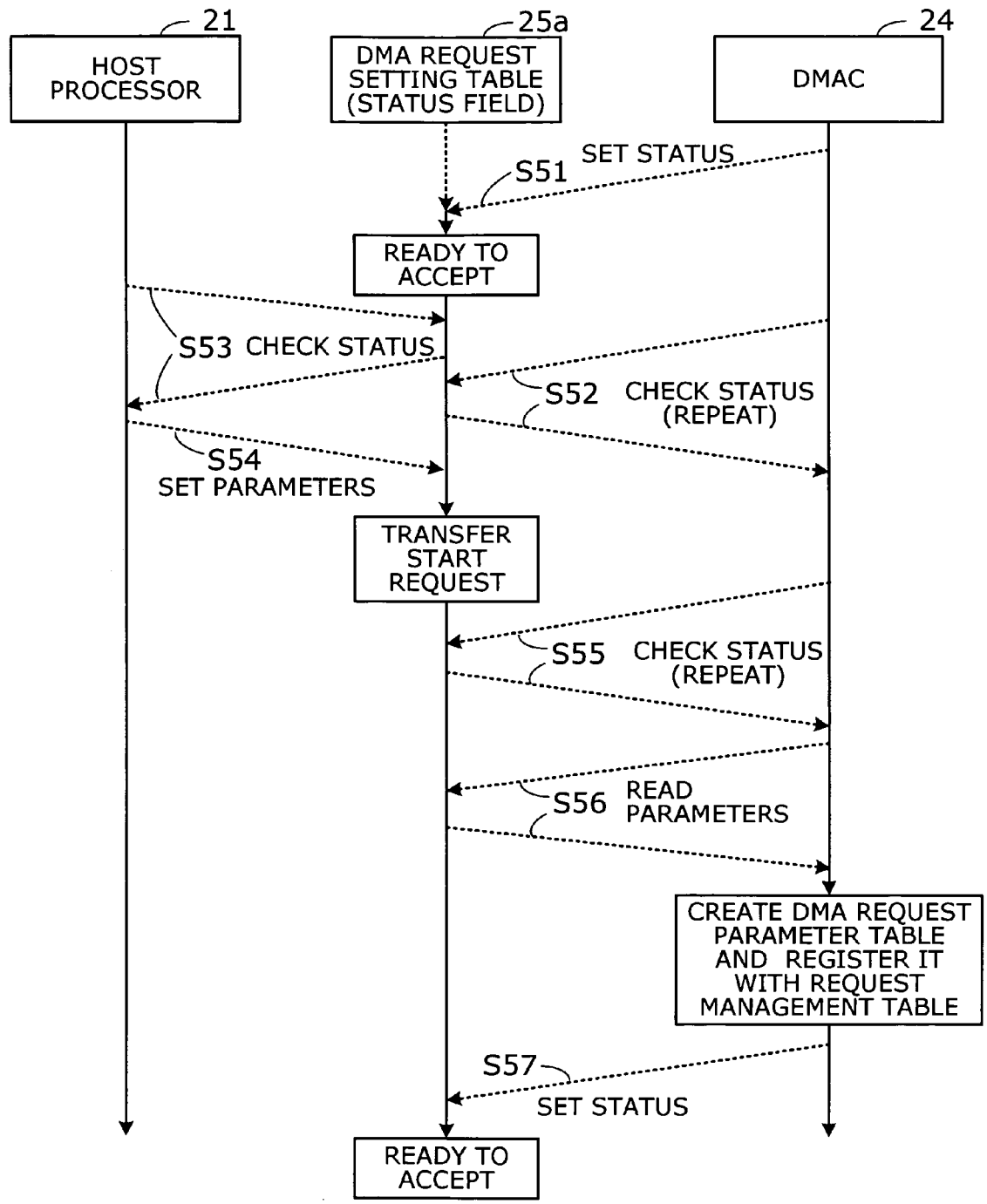
FIG. 16 is a sequence diagram of a status updating procedure.

The status field of the DMA request setting table 25a. is updated in the way shown in the sequence diagram of FIG. 16. Initially the DMAC 24 sets a "ready to accept" status to the DMA request setting table 25a (step S51). The DMAC 24 then polls the status field at regular intervals to check whether there is a DMA request (step S52). When there arises a situation where a DMA transfer is necessary, the host processor 21 checks the status field of the DMA request setting table 25a to determine-whether it can write DMA parameters to the DMA request setting table 25a (step S53). If the status field indicates a "ready to accept" status, the host processor 21 changes that field value to "transfer start request" after writing source and destination addresses and other parameters to the DMA request setting table 25a (step S54). The DMAC 24 detects this "transfer start request" status in the course of its regular status polling (step S55). The DMAC 24 then creates a new DMA request parameter table 25j containing request parameters and registers a pointer to that table 25j with the DMA request management table 25k (step S56). Lastly, the DMAC 24 reverts the status field to "ready to accept" (step S57).

The above-described method of the present embodiment provides compatibility in host processor programming since it permits a host processor to handle the DMAC of the present invention in the same way as with conventional DMACs.

Fifth Embodiment

This section describes a fifth embodiment of the present invention, which is directed to the reduction of host processor workloads. In the fifth embodiment, the host processor has only to control timings and check status while relying more heavily on DMA programs as to the actual DMA transfer operations. This approach of the fifth embodiment alleviates the workload of the host processor.

Recall the fourth embodiment, in which the host processor 21 sets DMA parameters and a DMA transfer start command to trigger the DMAC 24 to add a new DMA request to the DMA request setting table 25a. By contrast, the fifth embodiment allows the host processor to write multiple sets of parameters directly into the DMA request management table, except for a start command to the DMAC 24. After that, the host processor 21 issues start commands in synchronization with other events, which causes the DMAC 24 to process the pending requests in the DMA request management table one by one. Each time one DMA, transfer is finished, the DMAC 24 enters a standby state and stays there until another start command comes from the host processor 21. More specifically, the DMAC 24 determines whether to start the next DMA transfer, waiting for a command which may be placed in a synchronization parameter area previously reserved in a channel management table.

In a class of applications such as signal processing, DMA transfers are often performed in a particular pattern. Think of, for example, an image processing application in which each single video frame is processed in small blocks. DMA data transfer is performed repeatedly and regularly to input each unprocessed block, as well as to output each resulting block, as many times as the number of blocks constituting a frame. In this application, it will be more efficient for the host processor 21 if all DMA parameters for those video frame blocks can be set beforehand, because the host processor 21 then has only to issue a start command synchronously with the processing of each block.

The host processor needs to fetch data required for the next processing in a timely manner, as well as to output (or save) the result data, according to the progress of program execution. With the DMAC of the fourth embodiment described earlier, and a conventional DMAC alike, DMA parameters must be set each time before a new DMA transfer is performed. The host processor, therefore, issues DMA parameters and commands to the DMAC in the middle of its own program execution, each time it needs a DMA transfer. However, the task of parameter setting occurs so frequently that it can be a non-negligible program overhead that affects the performance of the host processor.

According to the fifth embodiment, the DMAC is programmed to support the entire series of DMA transfers, as opposed to a DMA transfer of a single block, while only requiring a host processor to provide start timings. The workload of the host processor is therefore reduced greatly.

Figure 17:
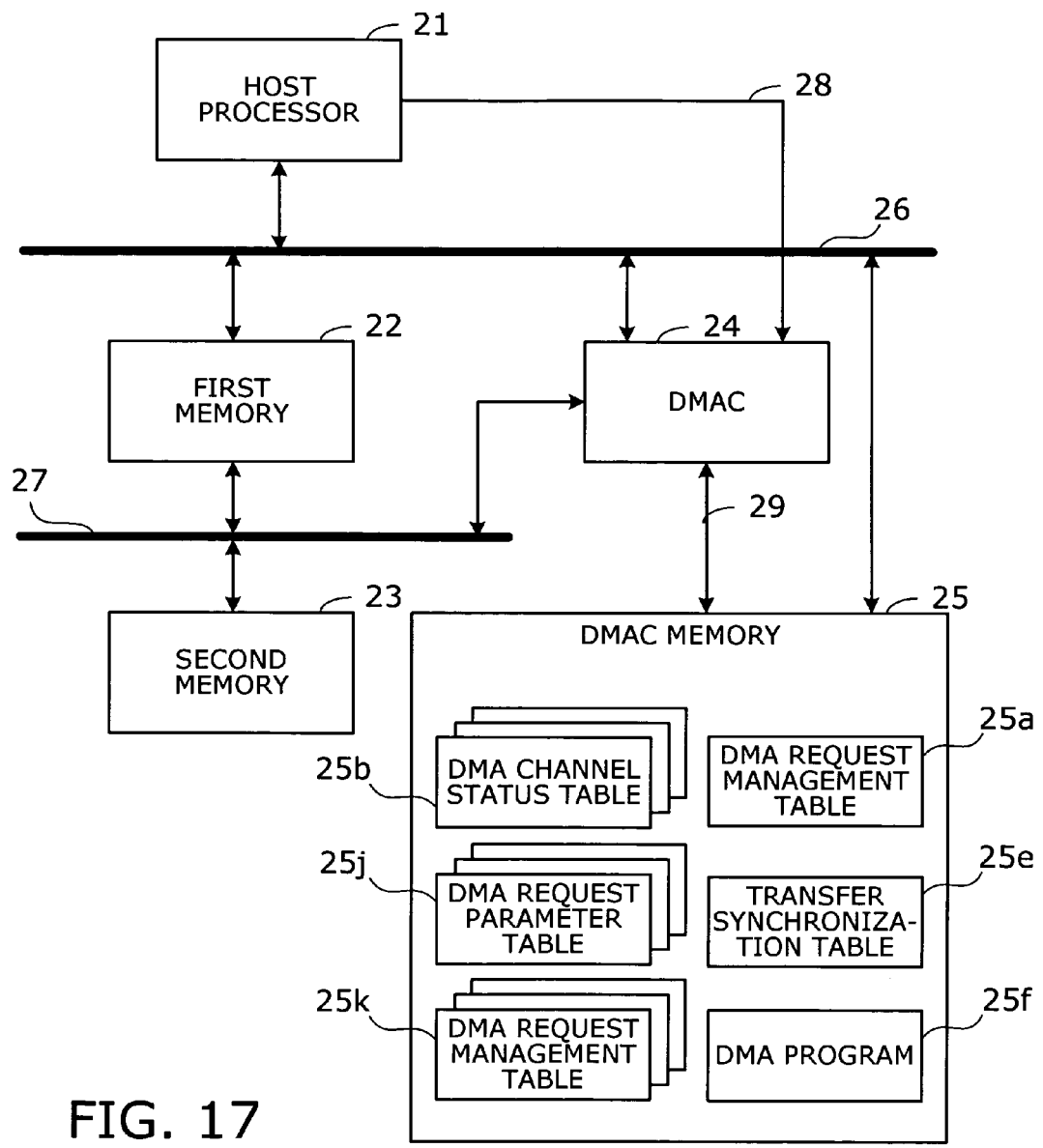
FIG. 17 shows an example system configuration according to a fifth embodiment of the present invention.

FIG. 17 shows an example system configuration according to the fifth embodiment of the present invention. Since the fifth embodiment assumes a similar system structure to that of the fourth embodiment, this section will focus on distinctive features of the fifth embodiment, while affixing like reference numerals to like elements.

Specifically, the fifth embodiment differs from the fourth embodiment in what the DMAC memory 25 contains. According to the fifth embodiment, its DMAC memory 25 contains the following data objects: a DMA request setting table 25a, DMA channel status tables 25b, a transfer synchronization table 25e, a DMA program 25f, a plurality of DMA request parameter tables 25j, and a plurality of DMA request management tables 25k. The DMA request setting table 25a, DMA channel status tables 25b, DMA request parameter tables 25j, and DMA request management tables 25k have the same data structure as their identically-named counterparts in the fourth embodiment. The transfer synchronization table 25e is used to manage start commands given to each channel. The DMA program 25f is a program code for DMA transfers that is particularly designed to alleviate the workload of the host processor 21 in controlling DMA transfers.

FIG. 18 shows an example of the transfer synchronization table 25e. This transfer synchronization table 25e provides the following data fields: "Channel No.," "Pointer," and "Status." The pointer field gives a pointer to a corresponding DMA channel status table. The status field indicates the operating status (e.g., "in progress" or "completed") of each channel.

The system with the above-described structure reduces the workload of the host processor 21. Think of, for example, an output buffer with a double buffer configuration. The term "double buffer" denotes alternate use of two buffers. More specifically, let us call those buffers "buffer A" and "buffer B." When it has a piece of output data at hand, the host processor 21 initiates a DMA transfer of previous data from buffer B to an external memory, besides saving that new output data into buffer A. The host processor 21 subsequently selects buffer B as the destination for next output data. When the next output data is ready, the host processor 21 initiates a DMA transfer from buffer A to the external memory, as soon as it directs the new output data to buffer B.

In conventional systems, all the above process is performed primarily by the host processor, while the DMAC has only to transfer data according to the parameters specified by the host processor. The fifth embodiment allows the same purpose to be achieved in a different approach. Specifically, the system uses only two DMA request parameter tables in association with the two buffers A and B, and they are served by two independent DMA channels. The DMA channel status table 25b of each channel contains parameters for a buffer-to-memory DMA transfer, including those that indicate repetitive execution of DMA transfers.

FIG. 19 shows an example of a DMA channel status table according to the fifth embodiment. As seen in the two bottommost rows, the DMA channel status table 25b has a mode parameter with a value of "repeat" and an optional parameter with a value of "forever." The repeat mode means that the DMAC 24 is supposed to move its focus back to the top of the table when all entries are served. The optional parameter "forever" indicates that there is no limit for the repetition.

As described above, the double buffer is realized by setting up two buffers A and B as repetitive two DMA requests on two channels. This is made possible by a "repeat" mode parameter with "forever" option in the DMA channel status table 25b. The DMAC 24 alternately transfers data of buffers A and B again and again, in synchronization with timing commands from the host processor 21. The double buffer realized in this way imposes little burden on the host processor 21 since the host processor 21 has only to trigger the DMAC 24.

Figure 20:
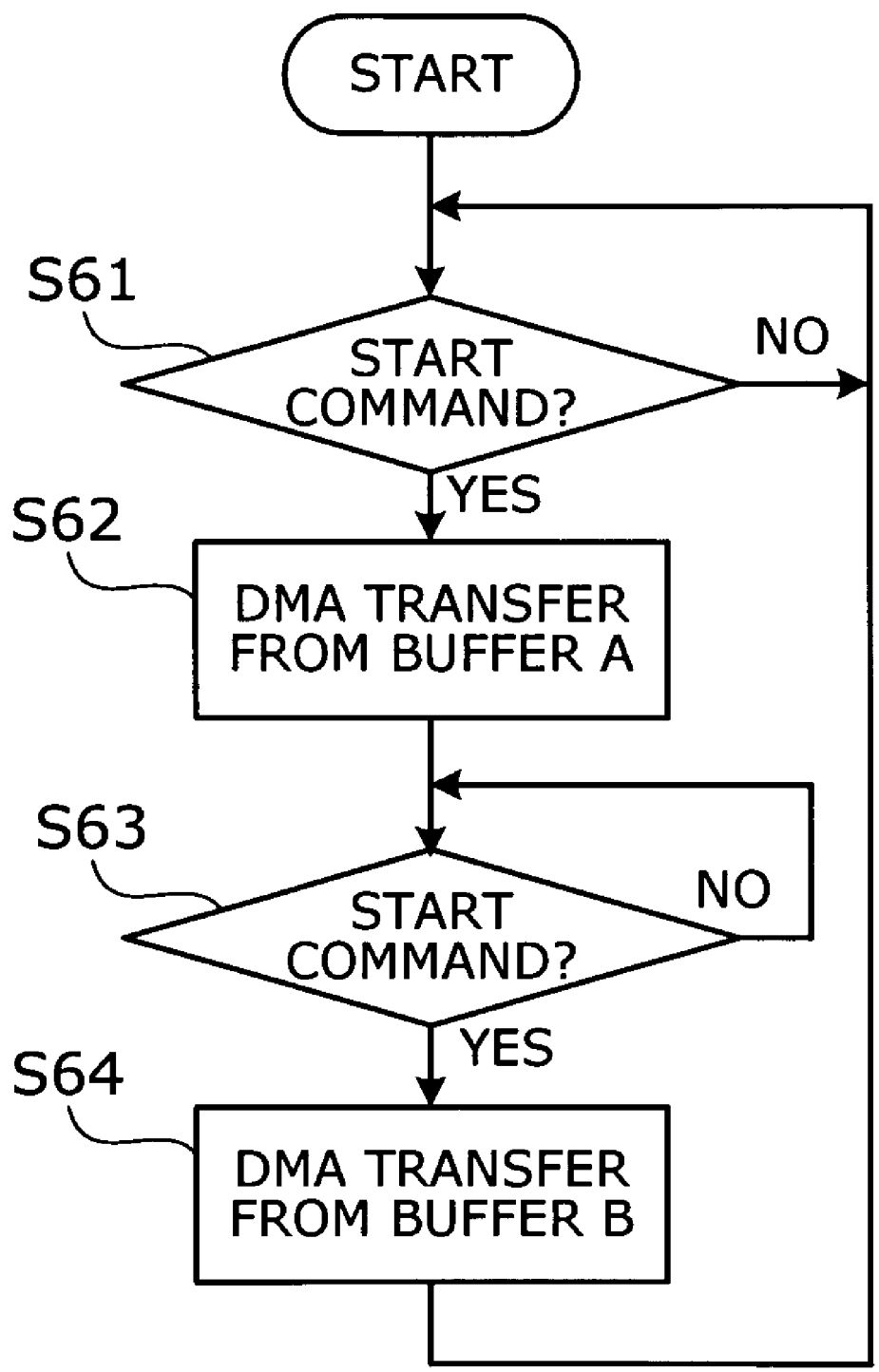
FIG. 20 is a flowchart of a DMAC synchronization process.

FIG. 20 is a flowchart of a DMAC synchronization process in the above double buffer application. This process includes the following steps:

(Step S61) The DMAC 24 tests whether the host processor 21 has placed a start command. If there is a start command, the process advances to step S62. If not, the process repeats this step S61.

(Step S62) The DMAC 24 performs a DMA transfer from buffer A to memory.

(Step S63) The DMAC 24 tests whether the host processor 21 has placed a start command. If there is a start command, the process advances to step S64. If not, the process repeats this step S63.

(Step S64) The DMAC 24 performs a DMA transfer from buffer B to memory. The process then returns to step S61.

Each time it completes a DMA transfer of a specified channel, the DMAC 24 sets a "complete" status to the transfer synchronization table 25e of that channel. The DMAC 24 does not execute DMA transfers of the same channel until its status is changed to "in-progress" by the host processor 21.

While the above example shows a case with two alternate buffers, the present invention is also applicable to other patterned DMA transfers. The fifth embodiment makes it possible to delegate most of such control tasks to the DMAC, which leads to a substantial reduction of workload of the host processor. Also, with a "repeat" mode set as a DMA request parameter, the DMAC 24 returns to the first entry of the DMA request setting table 25a after the last DMA request is finished. This function enables the same process to be applied to the next video frame.

Each time a programmed DMA transfer is finished, the DMAC 24 of the fifth embodiment enters a state where it waits for a new start command, while sending out a completion notification. The host processor 21 (or an upper layer of the DMAC 24) issues a new start command as soon as the completion of the previous DMA transfer is signified, whereby the DMA requests are executed continuously as in an ordinary queue operation.

Sixth Embodiment

This section describes a sixth embodiment of the present invention, which has a parameter checking mechanism. Hardware-implemented DMACs generally lack the capability of checking the integrity of parameters that are given, because it requires a more complicated circuit, and also because it makes it difficult to adapt the system to a change of memory capacity. DMACs of the present invention are far more programmable than conventional hard-wired DMACs. According to the sixth embodiment, the DMAC can consult a memory area data management table in an attempt to test the given DMA request parameters, including source and destination addresses and data size, before it starts a DMA transfer process, or in the middle of that process. The host system would be informed of an error concerning DMA areas, if any.

Figure 21:
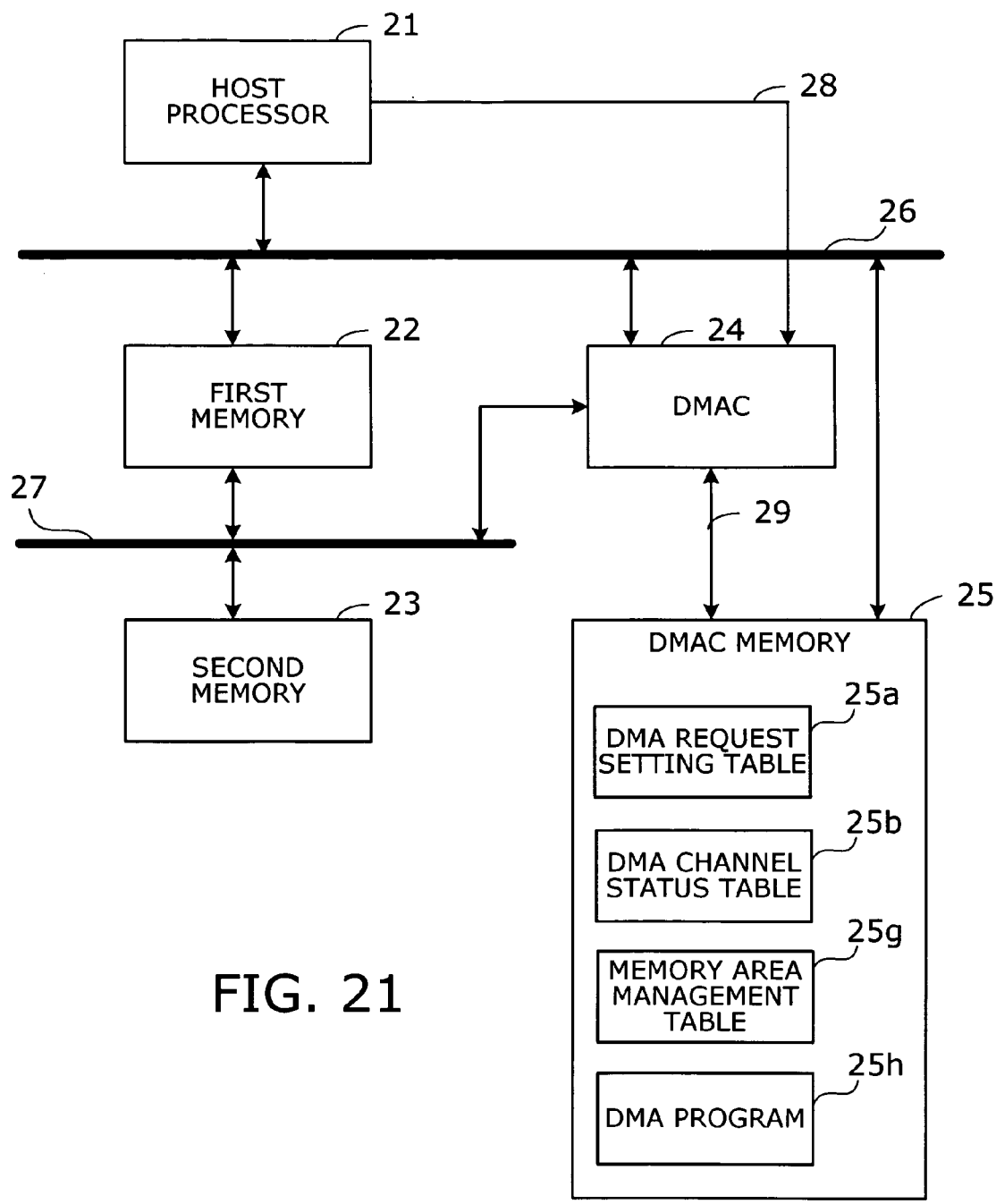
FIG. 21 shows an example system configuration according to a sixth embodiment of the present invention.

FIG. 21 shows an example system configuration according to the sixth embodiment of the present invention. Since the sixth embodiment assumes a similar system structure to that of the fourth embodiment, this section will focus on distinctive features of the sixth embodiment, while affixing like reference numerals to like elements.

Specifically, the sixth embodiment differs from the fourth embodiment in what the DMAC memory 25 contains. According to the sixth embodiment, its DMAC memory 25 contains the following data objects: a DMA request setting table 25a, a DMA channel status table 25b, a memory area management table 25g, and a DMA program 25h. The DMA request setting table 25a and DMA channel status table 25b have the same data structure as their identically-named counterparts in the fourth embodiment. The memory area management table 25g contains status information of each memory area. The DMA program 25h is a program code for DMA transfers, including a process of checking parameter integrity.

FIG. 22 shows an example data structure of the memory area management table 25g. This memory area management table 25g provides the following data fields: "Area Number," "Start Address," "End Address," "Write Attribute," and "Read Attribute." The area number field contains a registration number of each divided memory area. The start address and end address fields show the range of each memory area. The write attribute field indicates whether each memory area is writable. If this field value is "Yes," then the corresponding memory area can be written. If it is "No," then that area is protected from write access. The read attribute field indicates whether each memory area is readable. If this field value is "Yes," then the corresponding memory area can be read. If it is "No," then that area is protected from read access.

Figure 23:
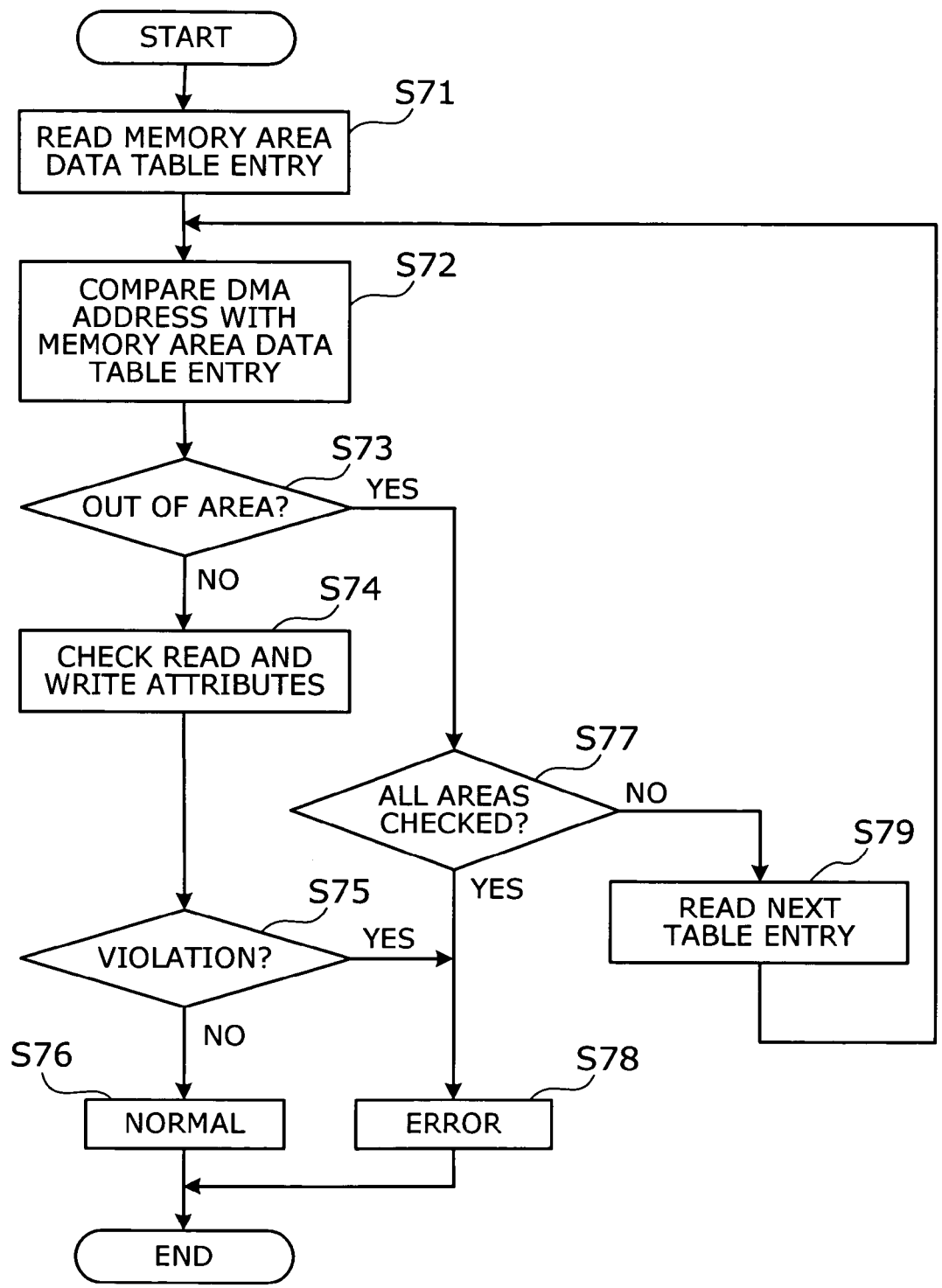
FIG. 23 is a flowchart of a parameter checking process.

FIG. 23 is a flowchart of a parameter checking process. This process validates individually the source and destination addresses specified as DMA request parameters, according to the following steps:

(Step S71) The DMAC 24 reads out one entry of the memory area management table 25g according to the order of area numbers, for example.

(Step S72) The DMAC 24 compares the memory area range with the specified DMA address (source address or destination address).

(Step S73) The DMAC 24 examines whether the DMA address falls within the memory area range. If so, the process advances to step S74. If not, the process proceeds to step S77.

(Step S74) The DMAC 24 then checks the read and write attributes of the memory area. The source address has to be readable, and the destination address has to be writable.

(Step S75) The DMAC 24 determines whether the test at step S74 indicates access violation. If the attribute in question is "Yes," then it means that there is no problem about memory access, and the process thus advances to step S76. If it is "No," the DMA transfer would commit an access violation. In this case, the process advances to step S78.

(Step S76) The DMAC 24 can execute the DMA transfer according to the DMA program 25h in a normal way, thus exiting from the present process with a positive result.

(Step S77) The DMAC 24 determines whether the DMA address has been checked for all memory areas listed in the memory area management table 25g. If so, the process advances to step S78. If not, the process proceeds to step S79 to check another memory area.

(Step S78) Since it has revealed that the DMA transfer would cause a memory access violation, or that the DMA address in question does not match with any of the registered memory areas, the DMAC 24 has to notify the host processor 21 of an error. This notification is made as an error status in either the DMA request parameter table or the DMA request management table, so that the host processor 21 can poll it.

(Step S79) The DMAC 24 returns to step S72, with another entry read out of the memory area management table 25g.

The parameter checking described above may be invoked in two ways. One is to check the given parameters before starting a new DMA transfer, and the other is to check parameter integrity in the middle of a DMA process each time before a unit amount of data is transferred. Besides being a lightweight process, the former method is suitable for DMA transfer of a linear, continuous data block, which is specified as a simple range between a start address and a destination address, or as a range defined by start address and data size parameters. The checking process tests the start and end addresses of both source and destination areas, and if no violation is found, it determines that the given DMA request has no error. This method is, however, not flexible enough to validate DMA transfers with a complicated pattern since their parameters are more than just a combination of a start address and data size.

The latter checking method is suitable for sophisticated cases such as transferring a rectangular area in a two-dimensional memory space. The DMAC 24 of the present invention can realize complex transfer patterns, whose DMA parameters cannot be tested easily before the actual transfer begins. While the inclusion of a parameter test for each data unit would slow down the transfer operation, this technique can work effectively in the stage of debugging a host processor program. That is, in debugging a host processor program, it is necessary to find and correct errors in the specified DMA addresses and other parameters. This is achieved by enabling the built-in parameter checking function. Once the program debugging is finished, the checking function is disabled since it is no longer necessary.

As can be seen from the above, the sixth embodiment takes advantage of the flexibility of this programmable DMAC 24 in implementing a function of validating DMA transfer areas based on the system information about memory arrangement.

That is, a given DMA address is compared with each entry of a memory area management table to check whether it is within a readable or writable memory space. It also checks memory area attributes, thus being able to detect access violations such as an attempt to write data in a read-only area. The parameter checking process returns a normal result status when the integrity is confirmed on both the memory range and read/write attributes. On the other hand, it returns an error status when no corresponding address area is found, or when the read/write attributes of a specified memory area conflicts with the expected DMA operation.

Seventh Embodiment

This section and subsequent sections will present more specific embodiments of the present invention, as well as comparing their distinctive features.

Figure 24:
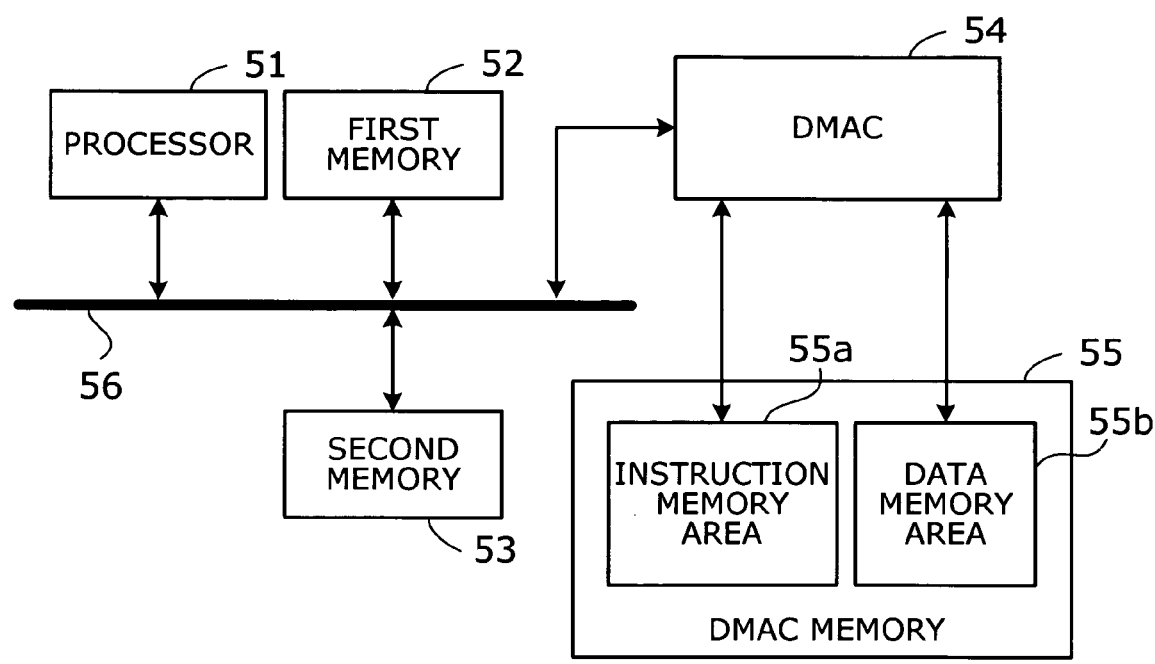
FIG. 24 shows an example system configuration according to a seventh embodiment of the present invention.

This section describes a seventh embodiment of the present invention, which is a more specific implementation of the first embodiment. FIG. 24 shows an example system configuration according to the seventh embodiment, in which a processor 51 is coupled to a first memory 52, a second memory 53, and a DMAC 54 via a bus 56. The processor 51 controls the entire system shown in FIG. 24. The DMAC 54 is coupled to its dedicated DMAC memory 55, in which an instruction memory area 55*a* and a data memory area 55*b* are reserved. The instruction memory area 55*a* contains a DMA program (not shown) that describes what the DMAC 54 is suppose to do.

The DMAC 54 performs DMA transfers according to the DMA program in the instruction memory area 55*a*. The DMAC 54 can also write and read necessary data to/from the data memory area 55*b*.

While it is not intended to exclude the use of single-port memory devices from the scope of the present invention, the DMAC memory 55 may be implemented with a dual-port memory to allow the DMAC 54 to make simultaneous access to instructions and data. Or alternatively, the DMAC memory 55 may be two separate memory devices, one for the instruction memory area 55*a* and the other for the data memory area 55*b*. Those configurations permit the DMAC 54 to fetch instructions from the instruction memory in parallel with read and write operation on the data memory, without causing memory access contentions or suffering consequent wait cycles. The DMAC 54 can therefore executes its program at a higher speed. As yet another arrangement of the DMAC memory 55, an additional data memory area may be disposed on the bus, aside from the data memory area 55*b*. In that case, the DMAC 54 can execute DMA transfers with reference to either or both of those data memory areas.

Figure 25:
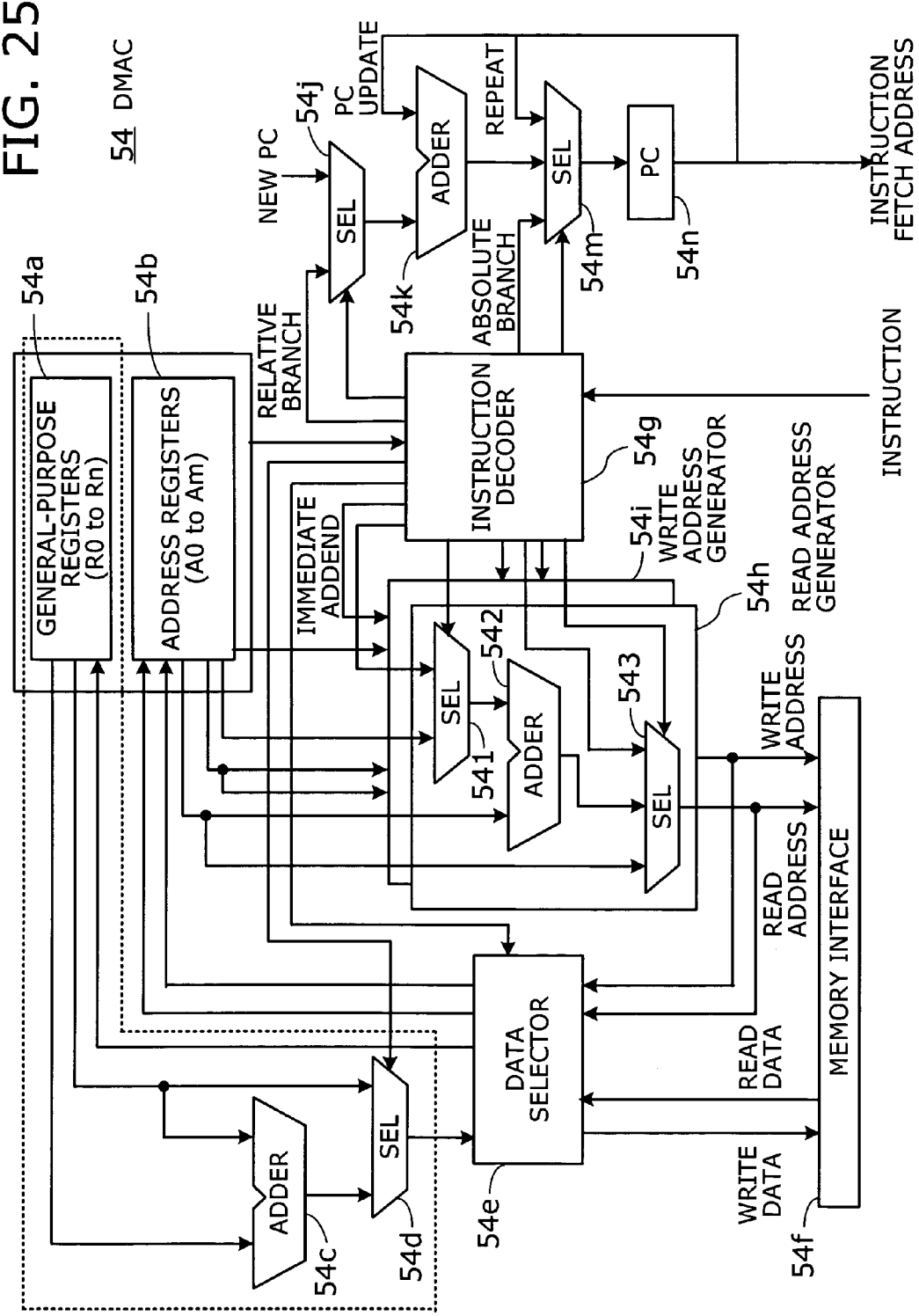
FIG. 25 is a block diagram showing the internal structure of a DMAC.

FIG. 25 is a block diagram showing the internal structure of the DMAC 54. The illustrated DMAC 54 has general-purpose registers 54*a*, address registers 54*b*, a first adder 54*c*, a first selector (SEL) 54*d*, a data selector 54*e*, a memory interface 54*f*, an instruction decoder 54*g*, a read address generator 54*h*, a write address generator 54*i*, a second selector 54*j*, a second adder 54*k*, a third selector 54*m*, and a program counter (PC) 54*n*. The read address generator 54*h* is formed from a selector 541, an adder 542, and a selector 543. The write address generator 54*i* has a similar internal structure as the read address generator 54*h*.

The general-purpose registers 54*a* have two output ports, one of which provides signals to both the first adder 54*c* and first selector 54*d*, and the other of which provides signals only to the first adder 54*c*. The address registers 54*b*, on the other hand, have four output ports. Two of them are connected to the read address generator 54*h*, and the other two are connected to the write address generator 54*i*. The read address generator 54*h* feeds one address register output to its selector 541 and the other to its adder 542 and selector 543. Likewise, the write address generator 54*i* routes the received address register outputs to its internal selectors and adder.

The first adder 54*c* adds two general-purpose register outputs and sends the resulting sum to the first selector 54*d*. The first selector 54*d* selects either the adder output or one of the general-purpose register outputs, depending on a control signal from the instruction decoder 54*g*. The selected signal is directed to the data selector 54*e*.

The data selector 54*e* receives inputs from the first selector 54*d* and memory interface 54*f*. Based on a control signal sent from the instruction decoder 54*g*, it selects one of the given input data for storage in the general-purpose registers 54*a* or the DMAC memory 55. The selected data is sent to the general-purpose registers 54*a*, address registers 54*b*, or memory interface 54*f*, depending on a signal from the instruction decoder 54*g*.

The memory interface 54*f* is responsible for reading and writing data from/to the DMAC memory 55 (not shown in FIG. 25). For example, write data from the data selector 54*e* is written into a memory address specified by the write address generator 54*i*. For another example, the data in a memory address specified by the read address generator 54*h* is read out and supplied to the data selector 54*e*.

The instruction decoder 54*g* decodes instructions of a DMA program fetched from the instruction memory area 55*a*. According to each decoded instruction, the instruction decoder 54*g* commands the general-purpose registers 54*a* and address registers 54*b* to output their data or address values for use in calculation. The instruction decoder 54*g* outputs control signals to the selectors 54*d*, 541, 543, 54*j*, and 54*m*. These signals are changed according to calculation results.

According to control signals from the instruction decoder 54*g*, the read address generator 54*h* produces a read address for reading data. More specifically, the output of an address register 54*b* is supplied to the selector 541 as its one data input. The other input is an immediate addend (ADDI) provided by the instruction decoder 54*g*. The selector 541 selects either of those data inputs according to a signal from the instruction decoder 54*g* and provides the selected value to the adder 542. The adder 542 calculates the sum of this value and another address value sent from one of the address registers 54*b*, the result of which is supplied to the selector 543. The selector 543 selects one of its three data inputs (i.e., the outputs of one address register 54*b*, the adder 542, and the instruction decoder 54*g*) according to a control signal from the instruction decoder 54*g*. The selected value is delivered as a read address to the data selector 54*e* and memory interface 54*f*.

As mentioned above, the write address generator 54*i* has the same internal structure as the read address generator 54*h*. It produces a write address for writing data, according to a control signal from the instruction decoder 54*g*, and the produced write address is delivered to the data selector 54*e* and memory interface 54*f*.

The second selector 54*j* receives a new value of the program counter, as well as a relative branch address from the instruction decoder 54*g*. According to a control signal from the instruction decoder 54*g*, the second selector 54*j* selects and supplies one of the given values to the second adder 54*k*. The second adder 54*k* adds this value to the output of the program counter 54*n* and passes the result to the third selector 54*m*.

In addition to the adder output, the third selector 54m receives an absolute branch address from the instruction decoder 54g and the current instruction address from the program counter 54n. According to a control signal from the instruction decoder 54g, the third selector 54m selects one of those three inputs and passes it to the program counter 54n. More specifically, the third selector 54m selects an absolute branch address from the instruction decoder 54g in the case of executing an absolute branch instruction. In the case of updating the program counter, the third selector 54m selects the adder output. In the case of repeating the current instruction, the third selector 54m selects the output of the program counter 54n.

The program counter 54n is a register that points to a memory address from which the DMAC 54 fetches a new instruction,. The value of this program counter 54n is sent to the DMAC memory 55 as an instruction fetch address.

With the structure described above, the DMAC 54 executes a DMA program to perform DMA transfers. The elements of this DMAC 54 can be classified into basic features and extended features. The general-purpose registers 54a, first adder 54c, and first selector 54d are extended features (surrounded by the dotted lines), and the remaining elements are referred to as the basic features. While the present invention can be implemented only with the basic features, the extended features offers a higher degree of flexibility in programming of DMA.

The basic features include registers shown in FIG. 26. These registers are referred to as basic registers 61, which include: address registers 54b, a repeat counter, and a program counter 54n. While FIG. 25 does not shown them, the repeat counters are disposed as part of the instruction decoder 54g. The address registers 54b are named "An," where n is a positive integer including zero. Likewise, the repeat counters are named "RPCm," where m is a positive integer including zero. The program counter 54n, on the other hand, is named "PC."

The instruction decoder 54g parses basic instructions for the DMAC 54 to operate with its basic features. FIG. 27 shows the format and description of each instruction belonging to the basic instruction set 62, which the DMAC 54 can execute with its basic features.

More specifically, Set instruction "set D, val" sets an immediate value val to register D. Load instruction "load D, (SAD)" loads register D with data read out of a source address SAD. Store instruction "store (DAD), S" stores the content of register S in a destination address DAD. Move instruction "mov (DAD), (SAD)" copies data from source address SAD to destination address DAD. Repeat instruction "repeat" repeats the subsequent instruction a specified number of times. Jump instruction "jump condition, D" causes the process flow to jump to address D if a specified condition is met. With no particular condition specified, this instruction functions as an unconditional jump to the specified address D. Call instruction "call D" causes the DMAC 54 to execute a subroutine starting at address D. Return instruction "return" permits the process flow to exit from a called subroutine and come back to the original routine.

FIG. 28 shows several examples of branch conditions. The illustrated branch conditions 63 are as follows: Condition "RPCn=val" returns "True" if the n-th repeat counter RPCn becomes val after it is decremented by one. Otherwise, this condition returns "False." Another condition "RPCn>val" returns "True" if the n-th repeat counter RPCn is still larger than val even after it is decremented by one. Otherwise, this condition returns "False."

The DMAC 54 has more than one address modification functions 64 as shown in FIG. 29, where the mnemonics for modifying address and their descriptions are provided. Specifically, an addressing mnemonic "An++val" which outputs an address register value An as memory address and adds an increment val to An afterwards. Another addressing mnemonic "An+val" produces an address by adding an increment val to an address register An. Yet another addressing mnemonic "An+Am" outputs an address obtained by adding one address register Am to another address register An.

The DMAC 54 decodes the instructions explained in FIGS. 27 to 29 to execute them. Its basic instruction set only contains instructions for storing and loading of registers and memory, memory-to-memory data transfer, and program flow control. Notice that the DMAC 54 need not have sophisticated computational functions that general-purpose processors may have. Because of the simplicity of program execution circuits, the DMAC 54 can be realized at a lower cost. Processors are generally the costliest components in a system. While DMA functions may be implemented by employing a sub-processor for that purpose, the use of a DMAC of the present invention would be a far more economical solution.

To add flexibility to programming, the DMAC 54 may incorporate some extended registers. FIG. 30 shows examples of extended registers 65, which include a plurality of general-purpose registers 54a (shown in FIG. 25) and a flag register (not shown in FIG. 25). The general-purpose registers are named "Rp," where p is a positive integer including zero. The flag register is named "F."

The DMAC 54 may also be enhanced with extended instructions. Specifically, FIG. 31 shows the format and description of an extended instruction set 66. Add instruction "add D, S" calculates a sum of two specified registers S and D, replaces D with the sum, and reflects the result status in the flag register F. Subtract instruction "sub D, S" calculates a difference of one register D from another register S, replaces D with the difference (D−S), and reflects the result status in the flag register F.

Condition testing function of the DMAC 54 may also be extended as illustrated in FIG. 32. This extended condition 67 tests the content of the flag register F. Specifically, the condition "F=cnd" tests whether the flag register F agrees with a given condition "cnd." Condition cnd may be a Z (zero) status, NZ (non-zero) status, or the like. This extended condition can be used with the extended features of the DMAC 54.

As can be seen from the above example, a higher degree of flexibility in DMA programs is achieved by providing the DMAC 54 with general-purpose registers and an adder for a comparison operation with an extended instruction set.

The DMAC 54 with the above-described processing mechanism executes a DMA program stored in the instruction memory area. 55a, thereby performing a DMA transfer. FIG. 33 shows an example of such a DMA program. For simplicity, this example DMA program 68 assumes a simple fundamental DMA transfer. The DMA program 68 begins with the first instruction "set A0, 0×1000," which enters an immediate value 0×1000 to an address register A0. The second instruction "set A1, 0×2000" enters an immediate value 0×2000 to another address register A1. The third instruction "set rpc0, 10" sets an immediate value 10 to a repeat counter RPC0. The fourth instruction "repeat" causes the subsequent instruction to be repeated the number of times set in repeat counter RPC0. The fifth instruction "mov (A0++1), (A1++1)" copies data from the source address designated by one address register A1 to the destination address designated by another address register A0. The address registers A0 and A1 are both incremented by one after this copying operation is done.

Instructions are stored in the instruction memory area 55a of the DMAC memory 55. The DMAC 54 fetches each instruction at the location pointed to by the program counter 54n for execution by its instruction decoder 54g. After the execution, the instruction decoder 54g updates the program counter: 54n by sending control signals to the second and third selectors 54j and 54m, depending on the instruction that is executed. Thee next instruction is then fetched from a new memory location pointed to by the updated program counter 54n and supplied to the instruction decoder 54g.

Basically the program counter 54n is incremented each time after the execution of an instruction, but it depends on the kind of instructions. In the case of jump instruction, the program counter 54n is loaded with a new program address specified in the instruction. In the case of repeat instruction, the same address is repeatedly set to the program counter 54n. This is similar to what ordinary stored-program processors do. The address pointed to by the program counter 54n always falls within the instruction memory area 55a of the DMAC memory 55.

Addressing of transferred data, on the other hand, is based on address registers 54b. Memory address is generated automatically by an address calculation mechanism (i.e., read address generator 54h and write address generator 54i) in the DMAC 54, with the address modification functions explained in FIG. 29. Referring again to the example DMAC program of FIG. 33, data is transferred from a source address A1 to a destination address. A0, where A0 and A1 are incremented by one each time a move instruction is executed. This move instruction is: repeated ten times as specified by the preceding repeat instruction, thereby copying ten bytes of continuous data from one place to another.

In the seventh embodiment, we have described how the. DMAC 54 executes a program stored in the DMAC memory 55 with its program processing functions. The proposed approach of the present embodiment provides the DMAC 54 with an increased flexibility in performing DMA transfers. Since the instruction memory area 55a and data memory area 55b accept independent access, the DMAC 54 can enjoy high-speed access to both instructions and data without the fear of contention or resulting wait states during execution of DMA transfers.

Conventional hardware-oriented DMACs are limited in the number of DMA requests that they can manage, since their hard-wired request buffer only offers a fixed capacity. The seventh embodiment creates DMA request parameter tables in the data memory area 55b to store request parameters such as source address, destination address, and data size, as in the first embodiment described earlier. The DMAC 54 manages parameters contained in those DMA request parameter tables (see FIG. 2) by using a-DMA request management table (see FIG. 3.) so as to serve multiple DMA requests sequentially.

The DMAC 54 further uses a DMA channel status table (see FIG. 4) to manage the DMA request management table. Besides containing present attributes of the DMA request management table, this DMA channel status table offers operating status information, showing which requests in the management table have been finished and which DMA request is being executed. The use of this management table enables the. DMAC 54 to deal with a large number of DMA requests, since the table can hold as many requests as the allocated memory space allows, although there is always a limit of physical memory capacity.

The DMAC 54 of the seventh embodiment executes a DMA transfer program in the same way as in the first embodiment explained with reference to flowchart of FIG. 5. Specifically, the DMAC 54 first consults a relevant. DMA channel status table to identify which request is in process and then reads out the parameters of that request. According to the parameters, the DMAC 54 transfers a unit amount of data. It repeats this until the specified end condition is reached (i.e., remaining data size becomes zero). When one request is finished, the DMAC 54 turns to the next pending request, updating the request-in-process field of the DMA channel status table with an unfinished DMA request queued in the DMA request management table, as well as copying parameters from a corresponding DMA request parameter table before starting the new DMA transfer. The DMAC 54 completes its task when all requests have been finished in this way.

Eighth Embodiment

This section describes an eighth embodiment of the present invention, which is actually an image processing application of the first embodiment. Since the eighth embodiment assumes a similar system structure to that of the seventh embodiment discussed in FIGS. 24 and 25, this section will focus on distinctive features of the eighth embodiment, while affixing like reference numerals to like elements.

The preceding embodiments were explained with the assumption of relatively simple DMA request parameter tables, which contain a source address, destination address, and data size as primary parameters. DMA request parameter tables, however, can have more sophisticated content. Specifically, the DMAC 54 may check the mode field of the DMA request management table when it reads out parameters, and this mode value changes the way of transferring data. Suppose, for example, that "mode 1" is defined to be a rectangular block transfer. Mode-1 DMA transfer is applied to an image processing application which needs to move a rectangular area of a source image to a specified destination.

Figure 34:
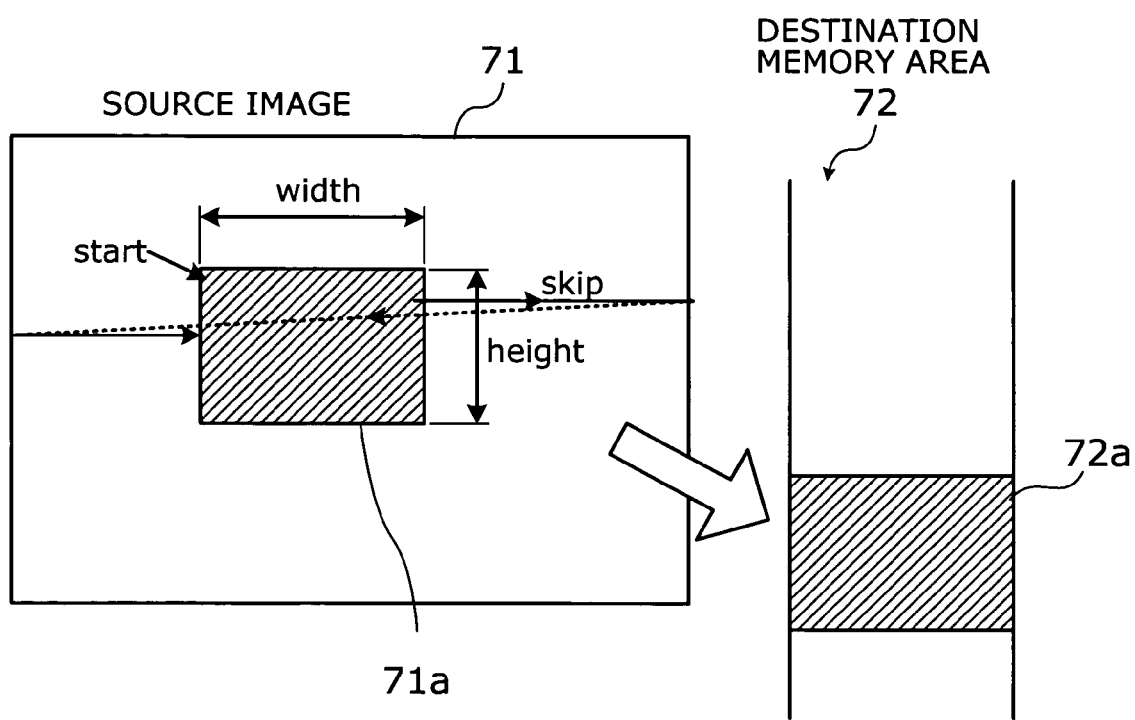
FIG. 34 shows the concept of a rectangular block DMA transfer.

FIG. 34 shows the concept of a rectangular block DMA transfer. Specifically, FIG. 34 shows a source image 71 stored in a memory, a rectangular area 71a of which is supposed to be clipped for use in another image data 72a in a destination memory area 72. Like this example, image processing applications often use a DMA transfer to copy a small rectangular portion of a large image.

Image data is arranged in a memory as an aligned set of individual horizontal lines. This means that the rectangular area 71a with a width shorter than the line length is not continuous, but distributed on a plurality of line data. It is, therefore, not easy to specify a DMA transfer only with source address and data size parameters, because we have to specify a different set of DMA parameters for different lines.

The eighth embodiment solves this difficulty by adding optional parameters to define a rectangle as indicated by the hatched area in the source image 71 of FIG. 34. These optional parameters will be set in a DMA request parameter table. FIG. 35 shows an example of a DMA request parameter table with optional parameters for transferring a rectangular block. In addition to source address, destination address, and data size, the illustrated DMA request parameter table 81 contains a mode parameter with a value of "Mode 1," accompanied by optional parameters that read: "Width=16," "Height=16," and "Skip=304." As mentioned, the mode-1 DMA transfer acts on a rectangular block. The range of a rectanglar block is specified by the accompanying option parameters. Specifically, the width parameter gives the block width in pixels, and the height parameter the block height in pixels. The skip parameter specifies, also in pixels, the distance between the last block data on one line to the first block data on the next line. The DMAC 54 skips this distance (i.e., jumps to the new line address) when transferring image data, based on the DMA request parameter table 81 of FIG. 35. The next paragraph gives details of how the DMAC 54 perform a rectangular block, DMA transfer.

Figure 36:
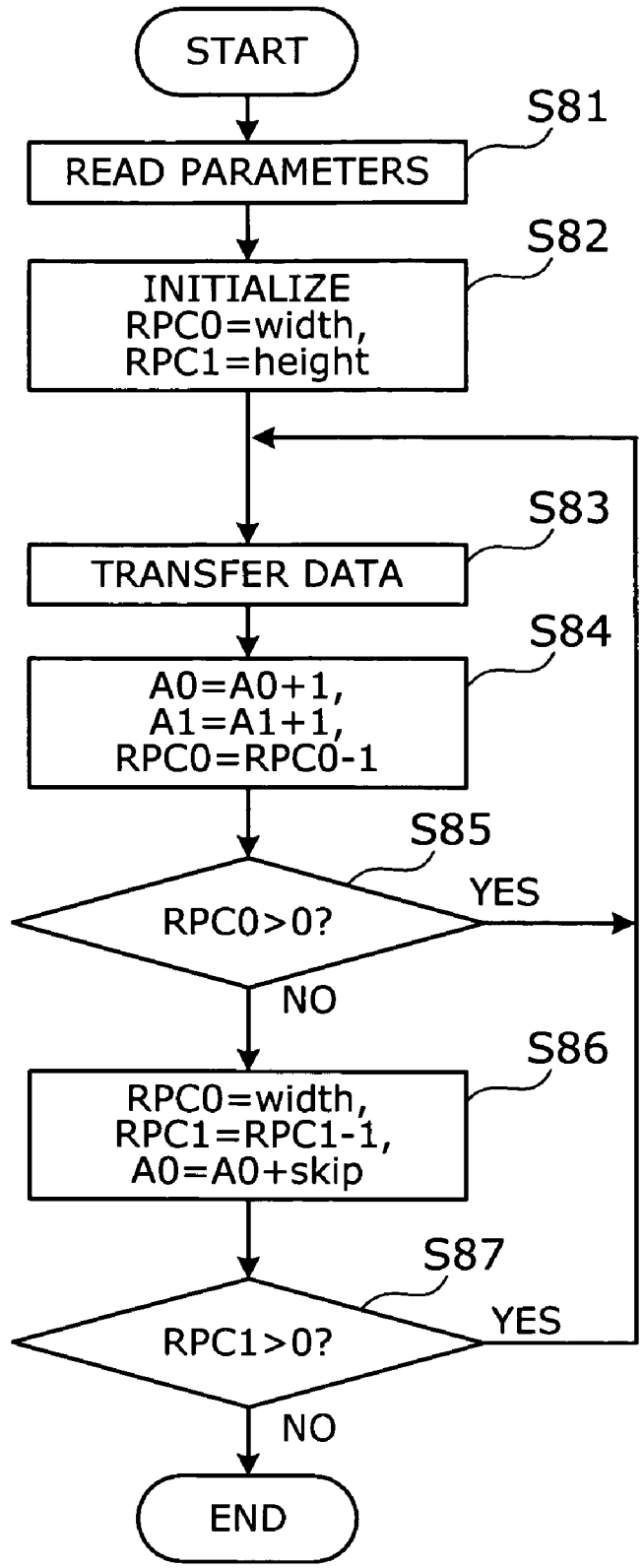
FIG. 36 is a flowchart of DMA transfer of a rectangular block.

FIG. 36 is a flowchart of a rectangular block DMA transfer process. This process includes the following steps:

(Step S81) The DMAC 54 begins with reading parameters.

(Step S82) The DMAC 54 initializes two repeat counters RPC0 and RPC1 representing the width and height of the rectangle with the values of the optional width and height parameters, respectively.

(Step S83) The DMAC 54 performs a DMA transfer of a unit amount of data.

(Step S84) Upon completion, the DMAC 54 updates the source address register A0 and destination address register A1. It also decrements the width counter RPC0 by one.

(Step S85) The DMAC 54 tests whether the width counter RPC0 is greater than zero. If so, the process goes back to step S83, thus repeating the above operation until one line of the rectangle is completely transferred. If RPC0 is zero, the process advances to step S86.

(Step S86) Now that one line is finished, the DMAC 54 updates address register A0 and height counter RPCI and initializes again the width counter RPC0. More specifically, the width parameter is set to the width counter RPC0 (i.e., RPC0=width), the height counter RPC is decremented by one (i.e., RPC1=RPC-1), and the skip parameter is added to address register A0 (i.e., A0=A0+skip).

(Step S87) The DMAC 54 tests whether the height counter RPC1 is greater than zero. If so, the process goes back to step S83, thus repeating the above steps until the data transfer is done for the entire height of the rectangle. If RPC1=0, then it means the block transfer process is completed.

As can be seen from the above example, the DMAC 54 of the eighth embodiment offers different transfer modes to adapt itself to different requirements. The DMA program describes various patterns of DMA transfers, depending on the given mode parameter. It is difficult for conventional hard-wired DMACs to provide such flexible functions, which the DMAC 54 realizes by taking advantage of its programmable architecture.

The source and destination address parameters in DMA request parameter tables are written in absolute address form. It is, however, not intended to limit the invention to this particular method. The addresses are specified by using relative addressing techniques. Suppose, for example, that "mode 2" is defined as a relative addressing mode.

FIG. 37 shows an example of a DMA request parameter table using relative addressing. This DMA request parameter table 82 contains a mode parameter with a value; of "Mode 21" (relative addressing mode), together with source address, destination address, and data size. In relative addressing mode, the first DMA request registered in the DMA request management table is supposed to have absolute base addresses. DMA request parameter tables corresponding to the subsequent DMA requests are written in relative address form, if their mode parameter is set to mode 2.

With the above arrangement, a DMA request management table consisting of a set of DMA requests with a particular execution pattern can be reused for DMA transfers in other memory locations. That is, the address values specified in those tables can eventually be changed all at once, by altering only the base addresses in the first DMA request parameter table.

Figure 38:
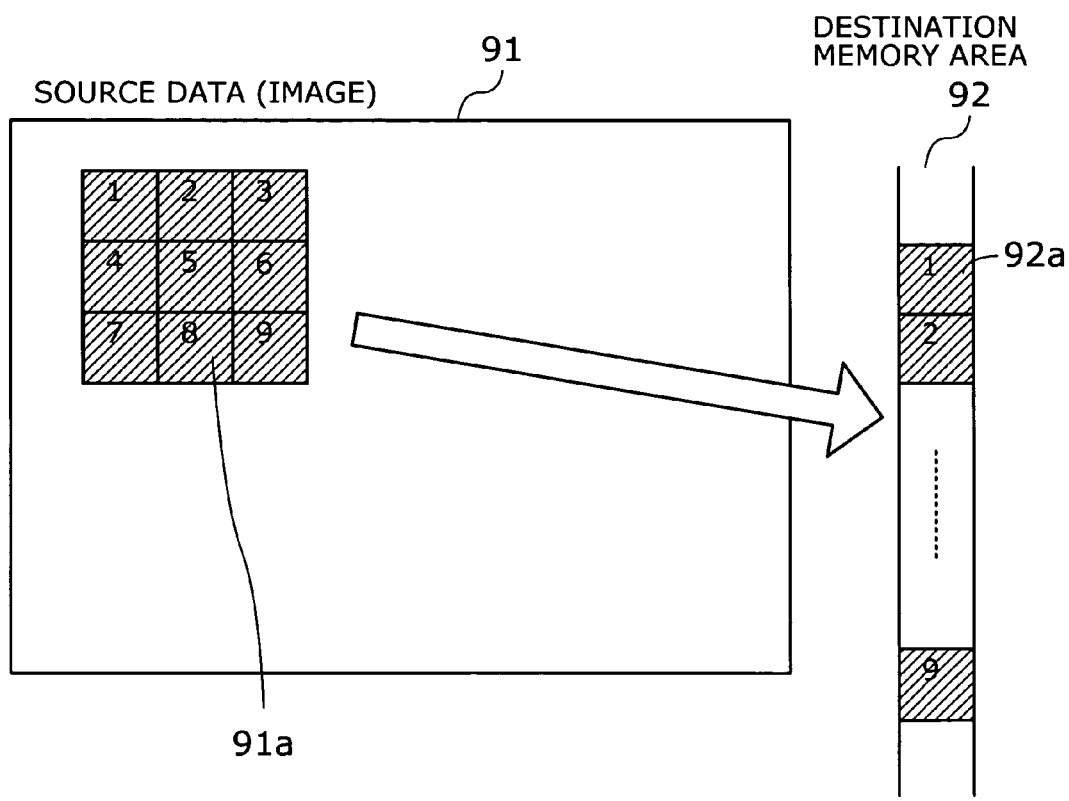
FIG. 38 shows an example of a rectangular block transfer.

Relative addressing mode makes it easy to define parameters for a rectangular block transfer, as shown in FIG. 38. In the example of FIG. 38, a rectangular area 91a in the source image 91 is divided into nine small rectangles. Once transferred, those small blocks 92a will align neatly in the destination memory area 92.

DMA transfers of all small blocks can be programmed by creating a DMA request management table in relative addressing mode and setting the top block address and DMA request management table. Relative addressing greatly contributes to the reduction of overhead related to set up of DMA transfers.

Also, as discussed earlier in the second embodiment, the present invention uses pointers in linking DMA channels. This technique makes it possible to activate a new channel by simply changing pointers. Referring again to the example of FIG. 38, nine rectangular blocks are shown. Image processing applications often encounter this pattern of data objects when they need to process a particular block with reference to its surrounding blocks. Data transfers related to the image processing of such a block pattern may previously be programmed as a set of DMA requests for one channel. When a need arises, data transfers for those blocks can be initiate by simply registering a pointer to that channel with the DMA channel management table and then giving a "valid" status to the corresponding attribute field. It is also easy to recall the same DMA pattern. Such flexibility is one of the biggest advantages that the present invention provides.

Ninth Embodiment

Figure 39:
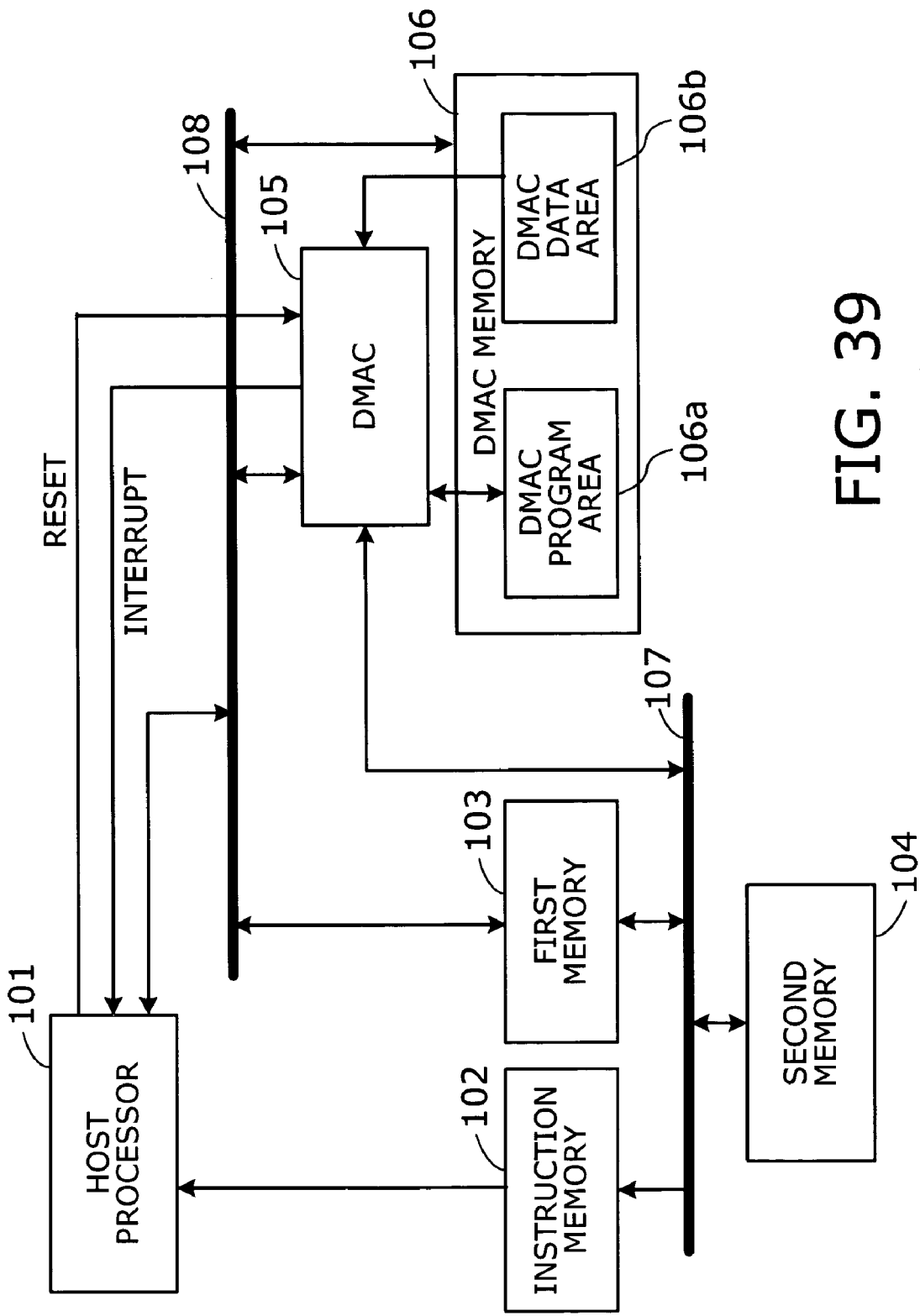
FIG. 39 shows an example system configuration according to a ninth embodiment of the present invention.

This section describes a ninth embodiment of the present invention, in which a host processor is coupled to a DMAC. FIG. 39 shows an example system configuration according to the ninth embodiment. In this system, a host processor 101 is connected with an instruction memory 102 and a DMAC 105. The host processor 101 sends a reset signal to the DMAC 105 and receives an interrupt signal from the host processor 101. The host processor 101 also communicates with a first memory 103, DMAC 105, and. DMAC memory 106 via a bus 108. The host processor 101 controls the entire system according to instructions supplied from the instruction memory 102.

The DMAC 105 is connected to the instruction memory 102 and first and second memories 103 and 104 via another bus 107. Further, the DMAC 105 has a dedicated bus to make access to a DMAC memory 106. The instruction memory 102 is a storage device storing instructions for the host processor 101, while the first memory 103 and second memory 104 store various data. The DMAC memory 106 provides a DMAC program area 106a and a DMAC data area 106b, the former storing DMA programs and the latter storing various table used in DMA transfers.

The host processor 101 is allowed to stop the DMAC 105 by asserting a reset signal so as to change the DMA programs during system operation. The DMAC 105 restarts with the new DMA program when the host processor 101 negates the reset signal.

The DMAC 105 notifies the host processor 101 of completion of a DMA transfer by using an interrupt or status polling technique. The completion notification permits the host processor 101 to know the timings for advancing its data processing tasks, as well as for issuing a next DMA request.

DMA requests are invoked basically by the host processor 101, which are registered with a DMA request management table for reference by the DMAC 105. The DMAC 105 executes those registered DMA requests in the same way as in the first embodiment. When the need for a new DMA transfer arises, the host processor 101 may update the management table directly or indirectly. For direct updates, the host processor 101 must know the memory address of that table. In the case where the host processor 101 does not have the information, it passes the request to the DMAC 105 for indirect registration. Either of the direct and indirect interfaces can work well in the proposed system.

Advantages of Programmable DMAC

According to the embodiments described above, the proposed programmable DMAC realizes more sophisticated transfer operations than conventional hard-wired DMACs can do, thus alleviating the workload of a host processor. In addition to that, the DMAC, according to an aspect of the invention, offers a host interface that is compatible with a conventional one, which permits the host processor to interact with the DMAC without special care. Further, the DMAC of the present invention can be implemented at a lower cost, relative to conventional multi-processor solution for DMA capabilities. According to another aspect of the invention, it is possible to implement a parameter check function into the DMAC., which detects access violation based on given memory area information. This check function can be adapted to a different system configuration by giving new memory area information for that system. Those advantages of the proposed DMAC will be described in detail below.

The DMAC is designed to execute a program, which makes it easy to change its functions related to DMA transfers. Unlike general-purpose processors with a rich instruction set, the DMAC needs only a few simple instructions to execute. This modest requirement for instruction set leads to a smaller cost of implementation. The system includes a memory dedicated for use by the DMAC to offer advantages in functional flexibility, DMA performance, and system costs.

The dedicated DMAC memory is used to store data use to manage DMA transfers, which includes a DMA request management table for queuing DMA requests. This DMA request management table accepts as many request as the memory space allows. The pending requests are executed one by one, according to that table Thanks to this table-based request management, a particular pattern of DMA transfers can be prepared beforehand as a DMA request management table. The predefined DMA pattern can be invoked instantly when it is necessary, without the need for programming, individual DMA transfers. In addition to that, DMA request parameters for a channel can be specified with a relative addressing method, which reduces the overhead of a host processor in repeating a similar pattern of DMA transfers.

When two or more DMA channels are required, the present invention employs a DMA channel management table to manage them, allocating a DMA request management table for each DMA channel. This feature provides as many channels as the memory space allows. The DMAC processes DMA requests of each channel in a time-shared fashion.

According to yet another aspect of the invention, it is possible to prepare a DMA request management table beforehand for particular DMA transfers that are frequently performed in a fixed pattern. The prepared DMA pattern can easily be set up as a new channel by registering with the DMA channel management table. The same pattern can also be set up as another independent channel simultaneously with the first one.

According to still another aspect of the invention, the proposed DMAC operates with a host processor in a coordinated way. For example, the host processor changes DMA programs during system operation, or it may control start timings for synchronization purposes. The host interface of the DMAC can be, made compatible with conventional hard-wired DMACS, if necessary, allowing existing software applications to run without the need for modification. When the DMAC is required to operate in synchronization with its host processor, the DMA program may be designed to execute most tasks of a predetermined DMA sequence, in an, autonomous way, so that the host processor will only, have to give a trigger to the DMAC. This feature greatly alleviates the host processor's workload.

According to still another aspect of the present invention, the DMA program may include a parameter check function that examines the integrity of parameters of a given DMA request before or during execution. That is, the DMAC detects by itself an error in DMA request parameters. This feature is useful as a debugging tool for development of DMA programs.

Program Storage Medium

The DMA programs described above can be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD)), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for distribution of DMA programs. Network-based distribution of DMA programs is also possible, in which master program files are made available in a server computer for downloading to other computers via a network.

A computer has a DMAC with a DMAC memory, to which a DMA program is installed from a portable storage media or downloaded from a remote server computer. The DMAC executes the program read out of the DMAC memory, thereby performing the programmed functions.

CONCLUSION

As can be seen from the description of various embodiments, the DMACs of the present invention are designed to perform DMA transfers according to a DMA program stored in a dedicated DMAC memory. This arrangement enables the DMACs to have higher flexibility of functions, as well as achieving high-speed data transfers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transfer control system for transferring data between memory areas, comprising:
    a direct memory access (DMA) controller memory storing a DMA program describing how to perform a DMA transfer; and
    a DMA controller that performs, in response to an initial DMA request given in absolute addressing mode and subsequent DMA requests given in relative addressing mode, the DMA transfer between specified memory areas according to the DMA program stored in said DMA controller memory, wherein:

the initial DMA request specifies source and destination addresses as absolute addresses, the subsequent DMA requests each specify at least one of the source address and a destination address as a relative address with respect to a corresponding absolute address specified in the initial DMA request, the initial DMA request further specifies DMA parameters which the subsequent DMA requests omit, and said DMA controller maintains the DMA parameters specified by the initial DMA request, not only for use in executing the initial DMA request, but also for use in executing the subsequent DMA requests.

2. The data transfer control system according to claim 1, further comprising a dedicated bus connecting said DMA controller with said DMA controller memory.

3. The data transfer control system according to claim 1, wherein said DMA controller comprises:

an instruction decoder circuit that decodes instructions contained in the DMA program; and an address generator circuit that produces memory addresses for data transfer operations.

4. The data transfer control system according to claim 1, wherein:

said DMA controller provides a plurality of channels each accepting DMA requests;

DMA requests directed to each channel are stored in said DMA controller memory; and said DMA controller executes the DMA requests stored in said DMA controller memory by switching from one channel to another channel each time a unit amount of data has been transferred according to one of the DMA requests.

5. The data transfer control system according to claim 1, wherein:

the initial and subsequent DMA requests each contain address parameters and a mode parameter; and the mode parameter specifies whether to activate the relative addressing mode, whereby said DMA controller determines whether to recognize the address parameters as absolute addresses or relative addresses, based on the mode parameter.

6. The data transfer control system according to claim 1, wherein:

the initial DMA request specifies a rectangular area in a source memory space; and said DMA controller transfers data in the rectangular area that is extracted from the source memory space in response to the initial DMA request.

7. The data transfer control system according to claim 6, wherein:

the rectangular area is divided into a plurality of segments with discontinuous addresses; and said DMA controller transfers the rectangular area, skipping from one segment to another segment by generating the discontinuous addresses.

8. The data transfer control system according to claim 6, wherein the rectangular area is part of image data.

9. The data transfer control system according to claim 6, wherein said DMA controller interprets the initial DMA request as a transfer request for a rectangular area or a continuous memory block, depending on a mode parameter specified in the initial DMA request.

10. The data transfer control system according to claim 1, further comprising a host processor to control said DMA controller.

11. The data transfer control system according to claim 10, wherein said host processor are connected to said DMA controller via dedicated signal lines.

12. The data transfer control system according to claim 1, wherein said DMA controller comprises:

an instruction decoder that reads each instruction of the DMA program from said DMA controller memory and decodes the instruction to produce control signals; and an address generator circuit that generates DMA addresses according to the control signals from said instruction decoder.

13. A method for controlling direct memory access (DMA) transfers, comprising:

providing a DMA controller memory dedicated for DMA control purposes;

in the DMA controller memory a DMA program that describes how to perform a DMA transfer; and in response to an initial DMA request given in absolute addressing mode and subsequent DMA requests given in relative addressing mode, performing the DMA transfer between specified memory areas according to the DMA program, stored in said DMA controller memory;

wherein:

the initial DMA request specifies source and destination addresses as absolute addresses, the subsequent DMA requests each specify at least one of the source address and a destination address as a relative address with respect to a corresponding absolute address specified in the initial DMA request, the initial DMA request further specifies DMA parameters which the subsequent DMA requests omit, and said performing maintains the DMA parameters specified by the initial DMA request, not only for use in executing the initial DMA request, but also for use in executing the subsequent DMA requests.

14. A data transfer control system for transferring a plurality of rectangular memory blocks to another memory area, comprising:

a direct memory access (DMA) controller memory storing a DMA program describing how to perform a DMA transfer; and a DMA controller that performs, in response to an initial DMA request given in absolute addressing mode and subsequent DMA requests given in relative addressing mode, the DMA transfer of a plurality of rectangular memory blocks according to the DMA program stored in said DMA controller memory, where the initial DMA request specifies source and destination addresses as absolute addresses, the subsequent DMA requests each specify at least one of a source address and a destination address as a relative address with respect to a corresponding absolute address specified in the initial DMA request, only the initial DMA request includes parameters specifying dimensions of the plurality of rectangular memory blocks, and said DMA controller uses the dimension parameters, not only when executing the initial DMA request, but also when executing the subsequent DMA requests.

15. A method for transferring a plurality of rectangular memory blocks to another memory area, comprising:

storing a DMA program describing how to perform a DMA transfer; and performing, in response to an initial DMA request given in absolute addressing mode and subsequent DMA requests given in relative addressing mode, the DMA transfer of a plurality of rectangular memory blocks according to the DMA program stored in said DMA controller memory where the initial DMA request specifies source and destination addresses as absolute addresses, the subsequent DMA requests each specify at least one of a source address and a destination address as a relative address with respect to a corresponding absolute address specified in the initial DMA request, only the initial DMA request includes parameters specifying dimensions of the plurality of rectangular memory blocks, and said performing uses the dimension parameters, not only when executing the initial DMA request, but also when executing the subsequent DMA requests.

* * * * *

UNITED STATES PATENT AND TRADEMARK OFFICE
CERTIFICATE OF CORRECTION

| | | |
|---|---|---|
| PATENT NO. | : 7,415,550 B2 | Page 1 of 1 |
| APPLICATION NO. | : 11/140732 | |
| DATED | : August 19, 2008 | |
| INVENTOR(S) | : Ryuta Tanaka et al. | |

It is certified that error appears in the above-identified patent and that said Letters Patent is hereby corrected as shown below:

ON THE TITLE PAGE, ITEM (75) - INVENTORS

Line 3, Change "Kasasaki" to --Kawasaki--

Signed and Sealed this

Fourth Day of November, 2008

JON W. DUDAS
*Director of the United States Patent and Trademark Office*